United States Patent
Maclay et al.

(10) Patent No.: US 9,952,837 B1
(45) Date of Patent: Apr. 24, 2018

(54) REUSABLE COMPONENT IN A MODELING ENVIRONMENT

(71) Applicant: The MathWorks, Inc., Natick, MA (US)

(72) Inventors: David Maclay, Cambridge (GB); Jonathan J. Fielder, Cambridge (GB)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/676,230

(22) Filed: Apr. 1, 2015

(51) Int. Cl.
G06F 9/44 (2006.01)
G06F 9/45 (2006.01)

(52) U.S. Cl.
CPC .......... G06F 8/35 (2013.01); G06F 8/20 (2013.01); G06F 8/31 (2013.01); G06F 8/34 (2013.01); G06F 8/36 (2013.01); G06F 8/38 (2013.01); G06F 8/41 (2013.01)

(58) Field of Classification Search
USPC ........................................ 717/104, 106, 107
See application file for complete search history.

(56) References Cited

U.S. PATENT DOCUMENTS

| 5,754,860 | A | | 5/1998 | McKeeman et al. | |
|---|---|---|---|---|---|
| 5,764,982 | A | * | 6/1998 | Madduri | G06F 8/30 709/204 |
| 5,867,667 | A | * | 2/1999 | Butman | G06F 17/3089 707/E17.116 |
| 6,085,030 | A | * | 7/2000 | Whitehead | G06F 9/465 709/201 |
| 6,226,792 | B1 | * | 5/2001 | Goiffon | G06F 8/36 707/999.2 |
| 6,820,249 | B1 | * | 11/2004 | Jachmann | G06F 8/36 717/100 |
| 7,275,237 | B1 | | 9/2007 | Schneider et al. | |
| 7,324,931 | B1 | | 1/2008 | Warlock | |
| 7,487,080 | B1 | | 2/2009 | Tocci et al. | |
| 7,502,031 | B1 | | 3/2009 | Pike et al. | |
| 7,581,212 | B2 | | 8/2009 | West et al. | |
| 7,596,778 | B2 | | 9/2009 | Kolawa et al. | |
| 7,681,151 | B2 | | 3/2010 | Ciolfi et al. | |

(Continued)

FOREIGN PATENT DOCUMENTS

| EP | 1662381 A1 | 5/2006 |
|---|---|---|
| WO | WO 07/027622 A2 | 3/2007 |

OTHER PUBLICATIONS

NPL—Kramek—Adapters and Wrappers—2007, Published at http://www.vtk.org/Wiki/VTK/Wrappers, 2007.*

(Continued)

*Primary Examiner* — Hossain Morshed
(74) *Attorney, Agent, or Firm* — Cesari and McKenna, LLP; Michael R. Reinemann

(57) ABSTRACT

A system and method supports reusing model components or component artifacts in a first modeling environment where the model components or artifacts were created in a second environment. An interface to the model components or artifacts from the first modeling environment is analyzed, and compared to an interface from the second environment. A wrapper object is constructed to convert between differences identified among the two interfaces. Utilizing the wrapper object, the model components or component artifacts are reused in the second environment.

27 Claims, 20 Drawing Sheets

(56) References Cited

U.S. PATENT DOCUMENTS

| | | | |
|---|---|---|---|
| 7,689,970 | B1 | 3/2010 | Englehart et al. |
| 7,742,903 | B2 | 6/2010 | Ciolfi et al. |
| 7,774,172 | B1 | 8/2010 | Yunt et al. |
| 7,809,545 | B2 | 10/2010 | Ciolfi et al. |
| 8,156,481 | B1 | 4/2012 | Koh et al. |
| 8,311,793 | B2 | 11/2012 | Grosse et al. |
| 8,479,156 | B2 | 7/2013 | Hudson, III et al. |
| 8,527,943 | B1* | 9/2013 | Chiluvuri ............... G06F 8/30 717/106 |
| 8,713,540 | B2* | 4/2014 | de Castillo ............ G06F 8/51 717/105 |
| 2002/0083413 | A1 | 6/2002 | Kodosky et al. |
| 2002/0118225 | A1* | 8/2002 | Miksovsky ............ G06F 8/38 715/762 |
| 2004/0015863 | A1 | 1/2004 | McBrearty et al. |
| 2004/0153992 | A1 | 8/2004 | Molina-Moreno et al. |
| 2005/0039161 | A1* | 2/2005 | Pfander ................ G06F 9/541 717/105 |
| 2005/0055692 | A1* | 3/2005 | Lupini ................... G06F 8/61 717/174 |
| 2005/0177817 | A1* | 8/2005 | Arcaro .................. G06F 8/35 717/108 |
| 2005/0223354 | A1 | 10/2005 | Drissi et al. |
| 2006/0064669 | A1* | 3/2006 | Ogilvie ............ G06F 17/5045 717/106 |
| 2006/0064670 | A1* | 3/2006 | Linebarger ............ G06F 8/34 717/106 |
| 2007/0106489 | A1 | 5/2007 | Eryilmaz |
| 2008/0127057 | A1* | 5/2008 | Costa .................... G06F 8/34 717/106 |
| 2008/0263512 | A1 | 10/2008 | Dellas et al. |
| 2009/0007064 | A1* | 1/2009 | Yang ..................... G06F 8/34 717/106 |
| 2009/0132995 | A1 | 5/2009 | Iborra et al. |
| 2009/0138273 | A1* | 5/2009 | Leung ................... G06F 8/34 705/348 |
| 2009/0144704 | A1* | 6/2009 | Niggemann ............ G06F 8/24 717/124 |
| 2009/0164193 | A1* | 6/2009 | McMillan ......... G06F 17/5022 703/13 |
| 2009/0193391 | A1 | 7/2009 | Miller et al. |
| 2009/0254876 | A1 | 10/2009 | Kuriakose et al. |
| 2011/0145782 | A1* | 6/2011 | Brukner ................ G06F 8/36 717/104 |
| 2011/0208788 | A1* | 8/2011 | Heller .................... G06F 8/10 707/810 |
| 2012/0254827 | A1* | 10/2012 | Conrad ............ G06F 11/3604 717/104 |
| 2014/0310665 | A1* | 10/2014 | Alfieri ................ G06F 17/505 716/102 |

OTHER PUBLICATIONS

NPL—Book—Adapter Design Pattern—2013, located at https://sourcemaking.com/design_patterns/adapter, 2013.*
NPL—Stack Overflow—Wrapper Class—2009, published at http://stackoverflow.com/questions/889160/what-is-a-wrapper-class, 2009.*
Gamma, "Desing Patterns—Adapter Design Pattern", 2012, Addition-Wesley.*
Gramma, Book Titile: "Design Patterns", Oct. 21, 1994, Publisher: Addition-Wesley.*
"Getting Started with the NI LabVIEW C Generator," National Instruments Corporation, Jul. 2010, pp. 1-16.
"Simulink Coder: User's Guide," R2013a, The MathWorks, Inc., Mar. 2013, pp. 1-1353.
Tsay, Jeff, "A Code Generation Framework for Ptolemy II," Technical Memorandum UCB/ERL, Electronics Research Laboratory, Berkeley, CA, 94720, May 19, 2000, pp. 1-67.
"A Model Checking Example: Solving Sudoku Using Simulink Design Verifier," Lockheed Martin Corporation, 2009, pp. 1-7.
Cesario, W., et al., "Component-based Design Approach for Multicore SoCs," Proceedings of the 39th Design Automation Conference, New Orleans, Louisiana, DAC 2002, Jun. 10-14, 2002, pp. 789-794.
"Component-Based Modeling with Model Reference," The MathWorks, Inc., 2010, pp. 1-4.
Denger, C., et al., "Testing and Inspecting Reusable Product Line Components: First Empirical Results," Proceedings of The 2006 ACM/IEEE International Symposium on Empirical Software Engineering, ACM, Sep. 21,2006, pp. 184-193.
"Embedded Systems and System on Chip," FPGAs for DSP19, Version 3, Xilinx, Oct. 30, 2007, pp. 1104.
International Search Report and Written Opinion for Application No. PCT/US2010/059716, dated Mar. 31, 2011.
"Model Reference Variants," The MathWorks, Inc., 2009, pp. 1-4.
Nejati, Shiva et al., "Matching and Merging of Statecharts Specifications", 29th International Conference on Software Engineering (ICSE'07), May 2007, pp. 54-64.
Pickin, S., et al.," Test Synthesis from UML Models of Distributed Software," IEEE Transactions on Software Engineering, vol. 33, No. 4, Apr. 2007, pp. 252-268.
Popinchalk, Seth, "The Answer for Large Scale Modeling: Model Reference," Guy and Seth on Simulink, The MathWorks, Inc., <http://blogs.mathworks.com/seth/2008/12/05/the-answer-for-large-scale-modeling-model-reference/>, Dec. 5, 2008, pp. 1-4.
"Real-Time Workshop Embedded Coder: User's Guide Version 3," The MathWorks Inc, Oct. 2004, pp. 1-155.
Reiss, S., "Semantics-Based Code Search," Proceedings of the 31st International Conference on Software Engineering, IEEE Computer Society, May 16, 2009, pp. 243-253.
Sane, Aamod et al., "Object-Oriented State Machines: Subclassing, Composition, Delegation, and Genericity," ACM Sigplan Notices, vol. 30(10): 17-32, Oct. 1995.
"Simulink Design Verifier 2 User's Guide," The MathWorks Inc., Apr. 2011, pp. 1-470.
"Simulink® 7: User's Gide," The MathWorks, Inc., Apr. 2011, pp. i-lviii, 1-1 to 1-46, 2-1 to 2-78, 3-1 to 3-138, 4-1 to 4-32, 5-1 to 5-84, 6-1 to 6-30, 7-1 to 7-38, 8-1 to 8-122, 9-1 to 9-34, 10-1 to 10-18, 11-1 to 11-46, 12-1 to 12-18, 13-1 to 13-82, 14-1 to 14-12, 15-1 to 15-10, 16-1 to 16-44, 17-1 to 17-36, 18-1 to 18-56, 19-1 to 19-22, 20-1 to 20-80, 21-1 to 21-60, 22-1 to 22-46, 23-1 to 23-26, 24-1 to 24-234, 25-1 to 21-70, 26-1 to 26-26, 27-1 to 27-88, 28-1 to 28-44, 29-1 to 29-98, 30-1 to 30-96, 31-1 to 31-28, 32-1 to 32-26, 33-1 to 33-32, A-1 to A-4, Index-1 to Index-22.
"Simulink ®User's Guide: R2014b," The MathWorks, Inc., Oct. 2014, pp. 1-3158.
"Simulink Verification and Validation 3.0," The MathWorks, Inc., 2010, pp. 1-9.
"The Answer for Large Scale Modeling: Model Reference," Guy and Seth on Simulink, The MathWorks, Inc., Dec. 5, 2008, pp. 1-7.
Tiwari, R., et al., "Reuse: Reducing Test Effort," SIGSOFT Software Engineering Notes, ACM, Mar. 23, 2013, vol. 38, No. 2, pp. 1-11.
Toyoda, Masashi, et al., "Supporting Design Patterns in a Visual Parallel Data-flow Programming Environment," IEEE, Sep. 1997, p. 76-83.
J. Yi, "Improving Processor Performance By Simplifying And Bypassin Trival Computations" Computer Design: VLSI in Computers and Processors, 2002. Proceedings. 2002 IEEE International Conference, pp. 462-465.

* cited by examiner

| Functions | | Interface of Code being Reused | Interface of Code being Generated |
|---|---|---|---|
| 1 | Function Name: | mabstime__mr__mt_combined__refTID0 | mabstime__mr__mt_combined__refTID0 |
| | Input Arguments (Name, Data Type, Data Dimension, Complexity): | tid: non-complex, scalar, integer type | NONE |
| | Output Arguments (Name, Data Type, Data Dimension, Complexity): | rty_Out1: pointer to, non-complex, scalar, floating point type | rty_Out1: pointer to, non-complex, scalar, floating point type |
| 2 | Function Name: | mabstime__mr__c__initialize | mr__mabstime__mr__m__initialize |
| | Input Arguments (Name, Data Type, Data Dimension, Complexity) | 1. Rt_errorStatus: pointer to pointer to char type<br>2. timingBridge: pointer to struct type rtTimingBridge<br>3. mdlref_TID0, integer type<br>4. mdlref_TID1, integer type<br>5. mdlref_TID2, integer type<br>6. mdlref_TID3, integer type<br>7. mdlref_TID4, integer type<br>8. mabstime__mr__mt_combined__refrtM: pointer to mabstime__mr__mt_combine__RT_MODEL<br><br>The type definition for mabstime__mr__mt_combine__RT_MODEL is:<br>struct mabstime__mr__mt_combined__tag_RTM ( const char_T **errorStatus; | 1. Rt_errorStatus: pointer to pointer to char type<br>2. timingBridge: pointer to struct type rtTimingBridge<br>3. mdlref_TID0, integer type<br>4. mdlref_TID1, integer type<br>5. mdlref_TID2, integer type<br>6. mdlref_TID3, integer type<br>7. mdlref_TID4, integer type<br>8. mabstime__mr__mt_combined__refrtM: pointer to mabstime__mr__mt_combine__RT_MODEL<br><br>The type definition for mabstime__mr__mt_combine__RT_MODEL is:<br>struct mabstime__mr__mt_combined__tag_RTM ( const unit32_T *errorCode |

FIG. 6A

| 1 | Name, Data Type, Data Dimension, Complexity | /*<br>* File: enable_top_data.c<br>*/<br><br>#include "enable_top.h"<br><br>/* Model block global parameters */<br>uint8_T rtP_Increment = 1U;<br>/* Variable: Increment<br>* Referenced by: '<Root>/CounterA'<br>*/ | /*<br>* File: enable_top_data.c<br>*/<br><br>#include "enable_top.h"<br><br>/* Model block global parameters */<br>static uint8_T rtP_Increment = 1U;<br>/* Variable: Increment<br>* Referenced by: '<Root>/CounterA'<br>*/<br><br>/* Read the tunable parameter */<br>uint8_T getParam_rtP_Increment() {<br>  return rtP_Increment;<br>}<br><br>/* Write the tunable parameter */<br>void setParam_rtP_Increment(uint8_T paramValue) {<br>  rtP_Increment = paramValue;<br>} |
|---|---|---|---|

*FIG. 6C*

```
/* A model in Release 2.0 expects the component to have this interface
 *
 * Model initialize function
 */
void mabstime_mr_mt_c_initialize (
    const char_T**rt_errorStatus;
    const rtTimingBridge *timingBridge,
    int_T mdlref_TID0, int_T mdlref_TID1,
    int_T mdlref_TID2, int_T mdlref_TID3
    int_T mdlref_TID4,
mabstime_mr_mt_combine_RT_MODEL *const mabstime_mr_mt_combined_refrtM) {
```

FIG. 7A

```
/* Because code generated in Release 1.0 is being integrated, this function is a
 * wrapper that calls the Release 1.0 code.
 */
mr_mabstime_mr_mt_c_initialize (
    rt_errorStatus, timingBridge, mdlref_TID0, mdlref_TID1,
    mdlref_TID2, mdlref_TID3, mdlref_TID4,
    mabstime_mr_mt_combined_refrtM)

REUSABLE COMPONENT IN A MODELING ENVIRONMENT

The invention description below refers to the accompanying drawings, of which:

BRIEF DESCRIPTION OF THE DRAWINGS

FIGS. 6A-6C are partial views of a schematic illustration of an interface map in accordance with an embodiment;

FIG. 7A is a schematic illustration of a function call site;

FIG. 7B is a schematic illustration of a wrapper function in accordance with an embodiment;

DETAILED DESCRIPTION OF ILLUSTRATIVE EMBODIMENTS

Figure 1:
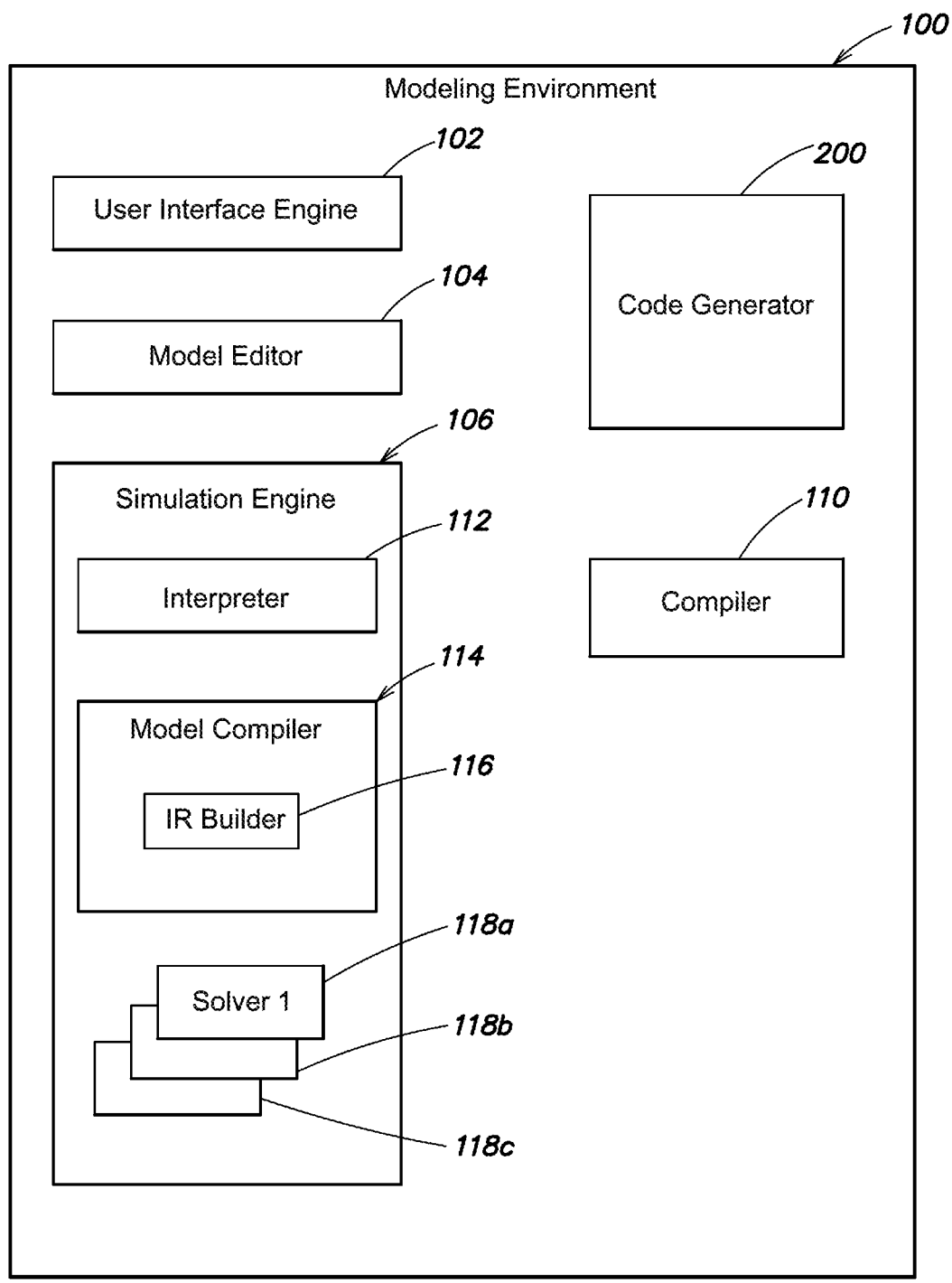
FIG. 1 is a schematic diagram of a modeling environment in accordance with an embodiment.

During the design of a large or complex system, different teams of engineers are often tasked with designing various components of the system. Each team may use a computer-based design environment, such as a model-based design environment, to create a design for the team's particular component. For example, a graphical and/or textual model of the component may be created in the model-based design environment. In addition, computer code, e.g., source code, may be generated for the component. The computer code may be automatically generated from the component by a code generation tool that may be a part of the model-based design environment. The computer code may be standalone code, e.g., it may be compiled and run outside of the model-based design environment. The type of code that is generated may depend on the target hardware platform intended to run or host the component. For example, if the target hardware platform is a server, source code compatible with the C, C++, or another programming language may be generated. This source code may be compiled into object code, and loaded onto the server for execution. If the target hardware platform is a microprocessor or Digital Signal Processor (DSP), source code, object code, or assembly language code may be generated. If the target hardware platform is one or more programmable hardware elements, such as a Field Programmable Gate Array (FPGA) device, a Complex Programmable Logic Device (CPLD), etc., then a hardware description language (HDL) representation of the component may be generated, and used to synthesize the programmable hardware element.

As each team completes the design of its component, the component may be tested or verified to confirm its operation, e.g., against one or more requirements specifications or documents.

Oftentimes, the teams may be running different design environments and/or code generators. For example, teams may be using design environments or code generators created by different software vendors, different design environments or code generators from the same software vendors, different versions or releases of the same design environment or code generator products, etc. Furthermore, the components created by the various teams may be assembled into a system model, which may be constructed and running in yet another design environment.

To implement the entire system, code may be generated for the system model, which may include generating new code for the various components. However, because this newly generated code may be generated by a different design environment and/or code generator, as compared to the ones used by the various teams, it will typically not be identical to the originally generated code. Accordingly, the newly generated code may require new verification testing. Because verification testing can be time-consuming and expensive to perform, this process of incorporating components into a system model, and generating new code can significantly delay completion of a project and/or increase its costs. It is desirable to reuse the original components or code generated therefor in the system model, because the original component or generated code are known to have passed the verification testing process. In addition, the original component or generated code may have been checked into a source code repository, such as a Source Code Management (SCM) tool, and thus locked against modification or editing.

Overview

Briefly, an embodiment of the present invention relates to systems and methods for supporting the reuse of components created in a first system design environment or the reuse of code generated by a first code generator in a second environment or as part of other code generated by a second code generator. In an embodiment, a system design environment, such as a model-based design environment, may include a plurality of modules, such as a model editor, a simulation engine and a code generator. The code generator may include a code integration engine. The code integration engine, in turn, may include an artifact analysis engine, an interface analysis engine, and a wrapper constructor.

In an embodiment, a system model may include a plurality of components. A user may direct the second code generator to generate code for the system model or to perform an operation that requires generated code for all or part of the system model. The user may indicate that, instead of generating new code for one of the components, the second code generator should reuse existing code previously generated for the component by the first code generator. The user may specify a location, e.g., within a file system, of the code to be reused. Alternatively, the user may provide a package, bundle, or other container of files or objects that contain the code being reused.

The artifact analysis engine may access one or more artifacts associated with the code being reused. Exemplary artifacts include data structures created during a code generation process that contain information regarding the generated code, metadata associated with generated code, release notes for different code generators, etc. The artifact analysis engine may retrieve or derive information regarding the interface of the code being reused. An interface represents a shared boundary across which two portions of a computer program or system exchange information. An interface may comprise calls, such as entry point or other function calls, method calls, input and output arguments, input and output variables, such as global variables, input and output signals, initialization settings, etc. The code generator may utilize this information to control the generation of code for the system model. For example, the code generator may utilize this information to guide the creation of an interface to the code being reused, so that the interface is compatible with the code being reused. By utilizing the information retrieved or derived from the one or more artifacts, the code generator may create an interface that differs from the interface that the code generator might otherwise create, and which might be incompatible with the code being reused.

The code generated for the system model may be source code, object code, assembly code, a hardware description language (HDL) representation, or some combination thereof.

In some embodiments, the interface analysis engine may analyze automatically the code being reused and/or the one or more artifacts associated with the code to identify the code's interface. The interface analysis engine also may analyze the system model code's interface to the code being reused. The interface analysis engine may identify calls, such as function calls and method calls made by the system model to the component, input arguments to the component, and output arguments received from the component, initialization settings, etc. The calls, arguments, signals, settings, etc. that the reused code is configured to receive and generate may differ from the calls, arguments, signals, settings, etc. that code generated for the system model is configured to send and/or receive.

The interface analysis engine may construct a relationship object that specifies a mapping between the interface of the code being reused and the interface of the code for the system model. The interface analysis engine may analyze the entire system model, including the component model. For example, the interface analysis engine may trace signals, function names, calls, variable names, argument names, etc. through the component. The interface analysis engine may also utilize information from one or more of the artifacts to construct the relationship object.

The wrapper constructor may build automatically one or more wrapper functions for the code being reused. The wrapper constructor may use the mapping information from the relationship object to correctly map calls and other interface elements to/from the code for the system model to calls and other interface elements to/from the code being reused. The wrapper constructor may construct the one or more wrapper functions to handle conversions between the interfaces. For example, the wrapper constructor module may generate executable statements that convert an argument as defined in the code for the system model's interface to the definition of the argument in the reused code's interface. The one or more wrapper functions as well as the code being reused may be included in the code generated for the system model. For example, a code project may be created, and the one or more wrapper functions may be included in a build or other type of file of the project. In some embodiments, the one or more wrapper functions may be in-lined in the generated code.

Because the code being reused is not modified or changed, verification testing performed on the code may remain valid despite the code's reuse in a different design environment or code generator. The code being reused can be marked as read only, e.g., by a SCM tool, and still be utilized by the different design environment or code generator.

If the system model, including its components, is ready for production deployment, the code generated for the system model and the reused code generated for one or more model components may be deployed on production hardware. If the system model is still in development and/or testing, portions of the code generated for the system model and/or the reused code, may be loaded onto a target platform that forms part of a test harness or verification framework. Software in the Loop (SIL) or Processor in the Loop (PIL) testing or simulation may be performed using the test harness or verification framework. The test harness or verification framework may invoke the code being reused, for example by incorporating the one or more wrapper functions.

FIG. 1 is a partial, schematic diagram of a modeling environment 100 in accordance with an embodiment. The modeling environment 100 may include a User Interface (UI) engine 102, a model editor 104, a simulation engine 106, a code generator 200, and a compiler 110. The UI engine 102 may create and present one or more User Interfaces (UIs), such as Graphical User Interfaces (GUIs) and/or Command Line Interfaces (CLIs), on the display of a workstation, laptop, tablet, or other data processing device. The GUIs and CLIs may provide a user interface to the modeling environment 100, and may be operated by users to initiate various model-related tasks, such as opening, creating, and saving models. The model editor 104 may perform selected operations on a model, such as open, create, edit, and save, in response to the user inputs or programmatically. In particular, the UI engine 102 and model editor 104 may provide or support a GUI having a model canvas for displaying a graphical design model and/or code editor for presenting a textual model.

The simulation engine 106 may include an interpreter 112, a model compiler 114, and one or more solvers, such as solvers 118a-c. The model compiler 114 may include one or more Intermediate Representation (IR) builders, such as IR builder 116. The simulation engine 106 may execute, e.g., compile and run or interpret, computer-generated models using one or more of the solvers 118a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair. A non-exhaustive description of suitable solvers may be found in the *Simulink 7 User's Guide* from The MathWorks, Inc. (September 2014 ed.)

Figure 2:
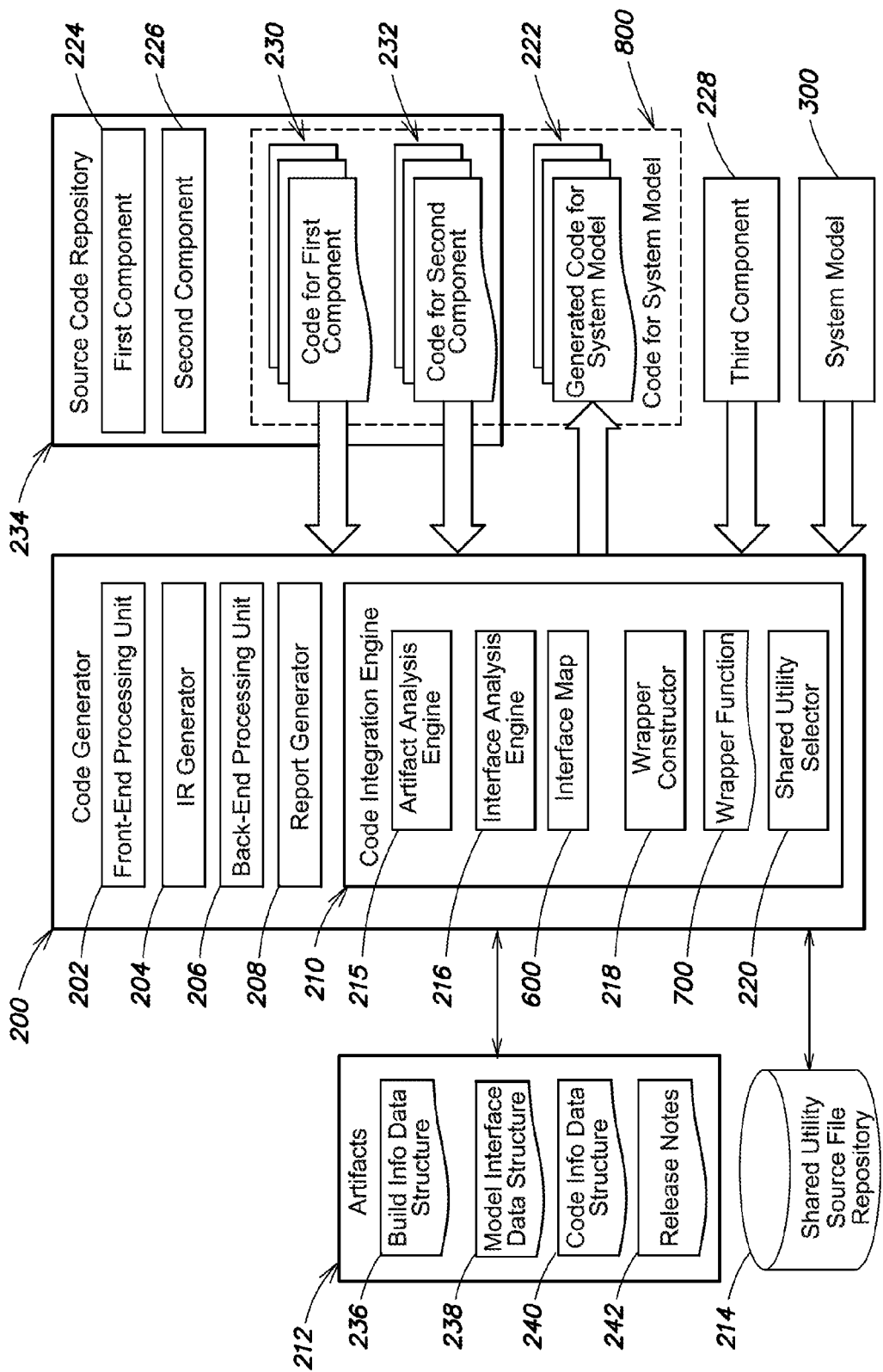
FIG. 2 is a schematic diagram of a code generator in accordance with an embodiment.

FIG. 2 is a schematic diagram of the code generator 200. The code generator 200 may include a front-end processing unit 202, an Intermediate Representation (IR) generator 204, a back-end processing unit 206, a report generator 208, and a code integration engine 210. The IR generator 204 of the code generator 200 may be the same as the IR builder 116 of the model compiler 114, or it may be a different IR generator/builder. The code integration engine 210 may include an artifact analysis engine 215, an interface analysis engine 216, a wrapper constructor 218, and a shared utility selector 220. The interface analysis engine 216 may generate a relationship object, such as an interface map 600, and the wrapper constructor 218 may generate one or more wrapper functions, such as a wrapper function 700. A wrapper function may include or be implemented as a wrapper object or a wrapper procedure, among other implementations.

The front-end processing unit 202, the IR generator 204, the back-end processing unit 206, and the code integration engine 210 may cooperate to automatically generate code, such as a plurality of generated code files indicated generally at 222, for one or more portions of a model, such as a system model 300. The system model 300 may include a plurality of components, such as a first component 224, a second component 226, and a third component 228. One or more of the components may be stored in a library or other data structure, and may be included in the system model 300 through pointers, references, or links. In some embodiments, one or more of the components may be in-lined within the system model 300. The system model 300 may also include one or more blocks or objects, action language statements or modules, and textual code statements or files, among other model elements. Generated code may already exist for one or more of the components of the system model 300. For example, generated code indicated generally at 230 and 232 may already have been generated for the first and second components 224 and 226. This generated code 230 and 232 may also have been tested and verified. The first and second components 224 and 226, as utilized in the system model 300, and the code 230 and 232 generated therefore may be stored in a source code repository 234.

The code generator 200 also may include or have access to one or more artifacts, designated generally at 212, and to a shared utility source file repository 214. Exemplary code generation artifacts 212 include a build information (info) data structure 236, a model interface data structure 238, a code info data structure 240, and release notes 242. The one or more artifacts 212 may be in the form of files, objects, project containers, databases, or other data structures.

The code integration engine 210 may integrate the previously generated code 230 and 232 for the first and second components 224 and 226 and the automatically generated code 222 for the one or more portions of the system model 300 in order to create code for the system model 300, which integrated code is indicated generally at 800. Code for the third component 228 may be generated as part of the code 222 generated for the system model 300.

The generated code 222, 230, and 232 may be in a form suitable for execution outside of the modeling environment 100, and may be referred to as standalone code. For example, the compiler 110 may compile the generated code 222, 230, and 232 for execution by a target hardware platform, such as a server, an embedded processor, a programmable logic device, etc.

The report generator 208 may generate one or more reports, such as model execution reports, error reports, code generation reports, interface reports, etc. The reports may be output to an output device, such as a display or a printer. The reports may also be saved to memory. The reports may be in a variety of formats, such as Portal Document Format (PDF), eXtensible Markup Language (XML), Hyper Text Markup Language (HTML), etc.

The modeling environment 100 and/or the code generator 200 may include additional or different modules.

In an embodiment, the code generator 200 and/or one or more of the modules thereof may be implemented through one or more software modules or libraries containing program instructions pertaining to the methods described herein. The software modules may be stored in a memory, such as a main memory, a persistent memory and/or a computer readable media, of a workstation, a laptop, a tablet, or other data processing machine or device, and executed by one or more processors or processing elements. Other computer readable media may also be used to store and execute these program instructions, such as non-transitory computer readable media, including optical, magnetic, or magneto-optical media. In another embodiment, the code generator 200 and/or one or more of the components thereof may comprise hardware registers and combinational logic configured and arranged to produce sequential logic circuits. In alternative embodiments, various combinations of software and hardware, including firmware, may be utilized to implement one or more embodiments.

The code generator 200 and/or portions thereof may be separate from the modeling environment 100. In such cases, the code generator 200 may communicate with the modeling environment 100, e.g., through local procedure calls (LPCs), remote procedure calls (RPCs), an Application Programming Interface (API), or another communication or interface technology.

In an embodiment, the modeling environment 100 is a high-level modeling application program. Suitable high-level modeling application programs include the MATLAB® algorithm development environment and the Simulink® model-based design environment from The MathWorks, Inc. of Natick, Mass., as well as the Simscape physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product from National Instruments Corp. of Austin, Tex., the Visual Engineering Environment (VEE) from Agilent Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, and the System Generator system from Xilinx, Inc. of San Jose, Calif. Alternatively, models or components may be created in a high-level programming language, such as the C, C++, C#, and SystemC programming languages.

Those skilled in the art will understand that the MATLAB® algorithm development environment is a math-oriented, textual programming environment for digital signal processing (DSP) design, among other uses. The Simulink® model-based design environment is a block diagram based design environment for modeling and simulating dynamic systems, among other uses. The MATLAB® and Simulink® environments provide a number of high-level features that facilitate algorithm development and exploration, and support model-based design, including dynamic typing, array-based operations, data type inferencing, sample time inferencing, and execution order inferencing, among others.

Models, such as the system model 300, constructed in the modeling environment 100 may include textual models, graphical models, and combinations of graphical and textual models. A given model, when executed, may simulate, e.g., approximate the operation of, a system. Exemplary systems include physical systems, such as weather systems, financial markets, plants, controllers for factory automation, engine control units (ECUs), anti-lock braking systems (ABS), flight controllers, communication systems, etc. Execution of a model by the modeling environment 100 may also be referred to as simulating or running the model.

In an embodiment, during operation of the modeling environment 100, a user interface, such as a Graphical User Interface (GUI), may be created by the UI engine 102 and presented on a display of a data processing device. The GUI may include a plurality of graphical affordances, such as a model canvas in which a visual presentation of one or more models may be displayed, a menu bar, a command bar, and other windows, panes, dialogs, and graphical elements. The command bar may include a plurality of command buttons, including a 'Run' button, for selection by a user of the modeling environment 100. Selection of the 'Run' button may cause the modeling environment 100 to run or execute a model. Alternatively or additionally, the UI engine 102 may present one or more Command Line Interfaces (CLIs) and one or more text-based commands may be entered in the CLI, e.g., by a user, in order to run a model. In response to the user selecting a Run button or entering the run command (or initiating model execution in another manner, such as by means of a keyboard shortcut, a menu selection, programmatically, etc.), the simulation engine 106 may execute the designated model, and may output the results generated by the model during its execution, for example, to the user via a display.

The model may be executed in an interpretive mode by the interpreter 112 in which the compiled and linked version of the model may be directly utilized to execute the model, e.g., over a desired time-span.

Model execution may be carried out for one or more model inputs, such as a set of model inputs, and may produce one or more model results or outputs, such as a set of model outputs. Model execution may take place over a time-span. For example, execution may begin at a start time, include one or more time steps, and end at a stop time. The start time, time steps, and stop time may be logical and have no correspondence with the physical passage of time. Alternatively, the start time, time steps, and stop time may have a correspondence with the physical passage of time and execution may operate in real time. The selection of the time steps may be determined by the selected solver 118.

Figure 3:
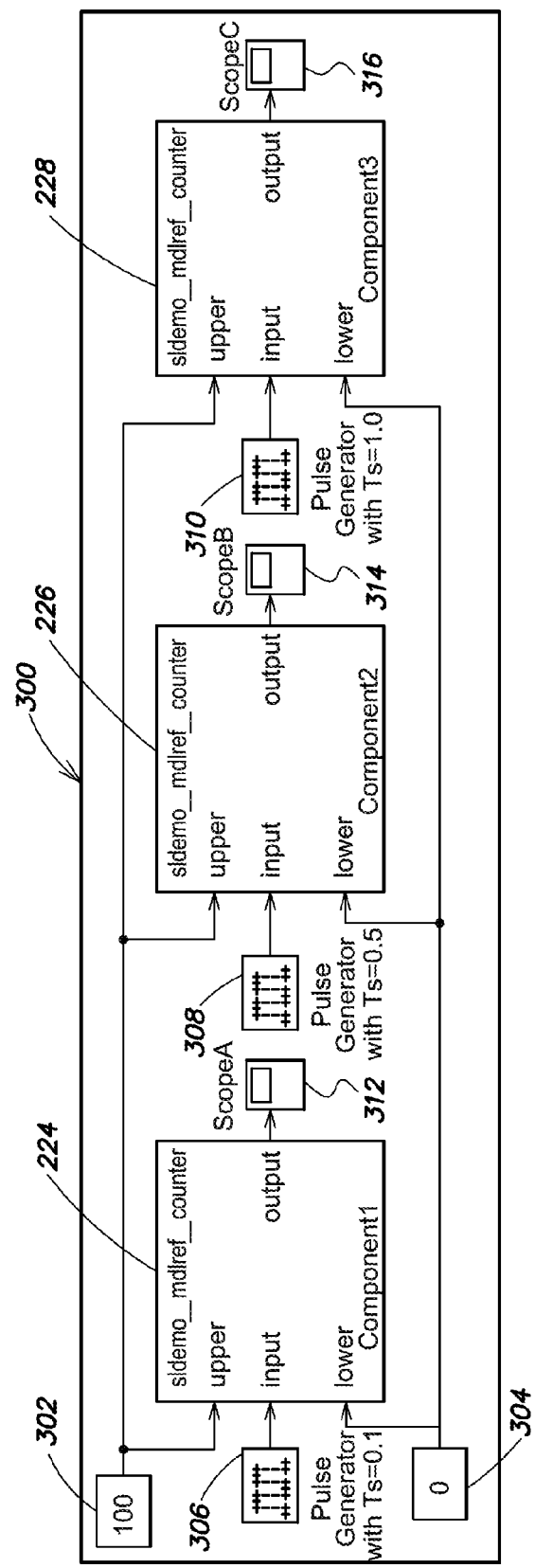
FIG. 3 is a schematic illustration of a system model in accordance with an embodiment.

FIG. 3 is a schematic illustration of the system model 300, which may be a computer-generated model having executable semantics. The system model 300 may be opened or constructed on a model canvas of a model editor window presented on a display by the UI engine 102. Construction of the system model 300 may include selecting a plurality of model elements, such as icons or blocks, from one or more libraries of pre-defined elements, and placing the selected model elements onto the model canvas. Relationships may be established among the model elements using connections, which may or may not be visually represented on the model canvas. The model editor window may include a menu bar and a toolbar, among other graphical elements. The toolbar may include a series of command buttons, including Run (or Play), Stop, and Pause buttons, among others. In response to the selection of the Run button, e.g., by a user, the simulation engine 106 may execute the system model 300.

The model elements may represent dynamic systems, computations, functions, operations, events, states, etc. The connections, which may appear as wires or arrows, may represent data, control, signals, events, mathematical relationships, physical connections, etc. Groups of model elements may be organized into a component. Exemplary components include superblocks, subsystems, submodels, state charts, subcharts, Virtual Instruments (VIs), subVIs, and libraries. A component may also include one or more other components.

The system model 300 includes the first, second, and third components 224, 226, and 228. In some embodiments, the first, second, and third components 224, 226, and 228 may be submodels implemented using model reference blocks of the Simulink modeling environment. The system model 300 may include additional components or model elements. Specifically, the system model 300 may include first and second constant blocks 302 and 304, first, second, and third pulse generator blocks 306, 308, and 310, and first, second, and third scope blocks 312, 314, and 316. Relationships, such as mathematical relationships, physical relationships, state transition relationships, event relationships, data relationships, control relationships, etc. may be established among the components and model elements of the system model 300. The relationships may be specified graphically, e.g., with arrows, lines, wires, etc., textually, or through a combination of graphical and textual elements.

The system model 300 may be a Simulink model, a Stateflow chart, a LabVIEW block diagram, a VEE diagram, a MATLAB file, a MatrixX model, etc. The system model 300 may represent a real world, dynamic system, such as a vehicle, an aircraft flight controller, an engine control unit (ECU), a power window controller, an electronic circuit, a financial system or instrument, a natural phenomenon, such as a weather patterns, etc.

Each component 224, 226, and 228 may have or otherwise define an interface, which may be referred to as a component interface. The component interface may include one or more external inputs to the component, one or more external outputs from the component, one or more initialization states, and one or more parameters, such as model-level parameters, whose values may be defined for the component. Values for the external inputs and outputs of a component may change over time during execution of the system model 300. For example, one or more of the inputs and outputs may be time-varying signals. Values for the initialization states and parameters, on the other hand, may be set once for each execution, e.g., simulation, of the component. To the extent a component is implemented graphically, such as through a block diagram model, the external inputs and outputs may be defined graphically.

A component interface may also include one or more control signals that may be used during execution to control the execution of one or more portions of the component, such as one or more conditional subsystems, one or more triggered state charts, etc. Exemplary control signals for conditional subsystems include: an enable control signal, which may cause a respective subsystem to execute when the enable control signal is positive; a triggered control signal which may cause a respective subsystem to execute when a trigger event occurs; and a control flow signal that may cause a respective subsystem to execute under the control of another model element of the design model, such as a control block.

As noted, code generated for a component may also include an interface, which may be referred to a code interface or simply an interface. A code interface may include one or more functions that represent entry points into the generated code. For example, a code interface may include a 'model_initialize' function that performs model initialization when called, a 'model_step' function that includes code for running model elements, and a 'model_terminate' function that includes shutdown code, and may be called as part of a system shutdown. Each function that represents an entry point to the generated code may have a calling interface. The entry points represented by these functions may be included in a header file. It should be understood that additional, fewer, or other entry points may be defined and included in a code interface. For example, other entry points may include an update function, an output function, a setup function, an enable function, and a disable function, among others.

Figure 5:
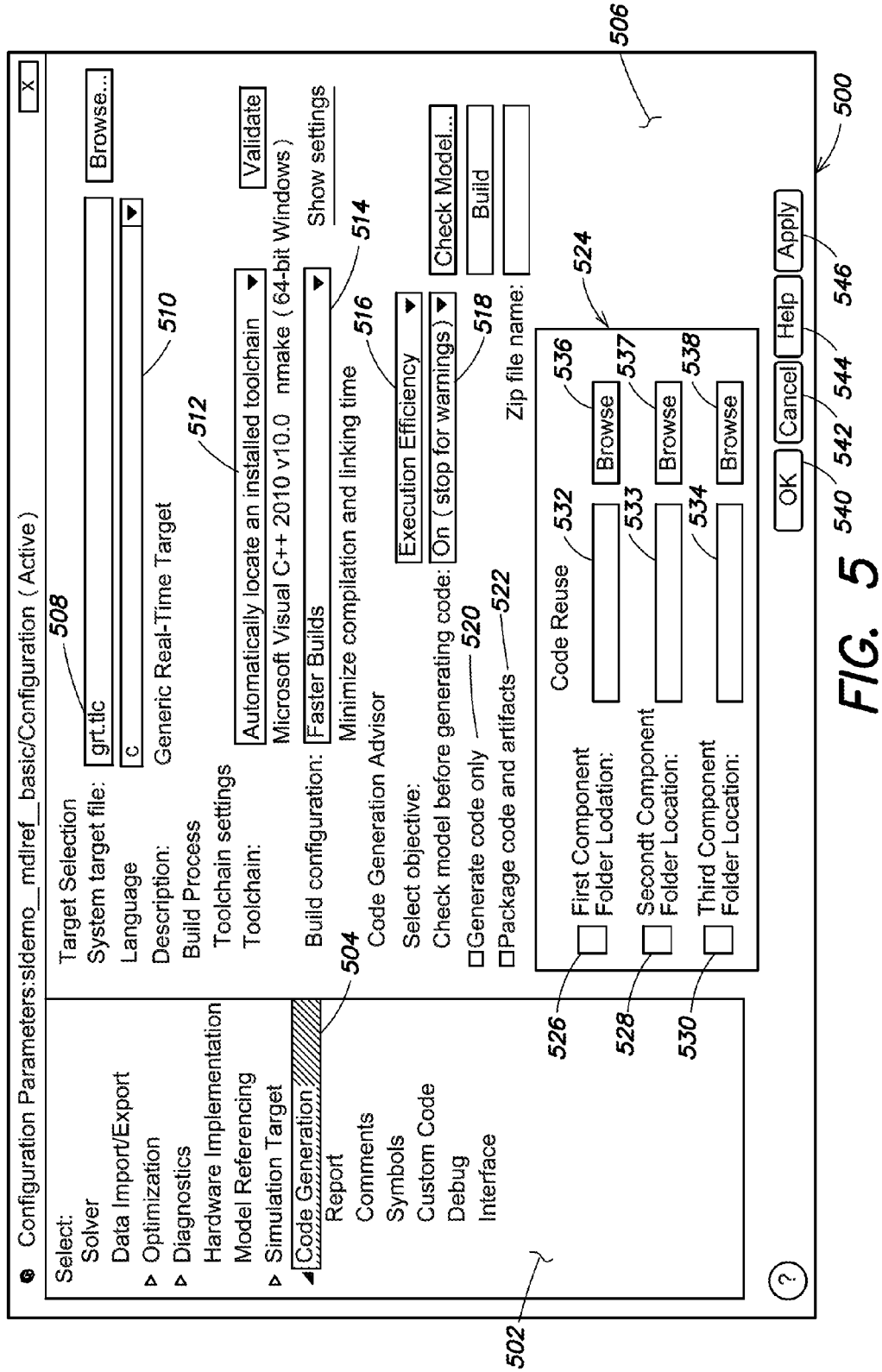
FIG. 5 is a schematic illustration of a code generation parameters dialog in accordance with an embodiment.

The generation of code for a model may be controlled based on one or more settings. The settings may be user-specified or programmatically defined. FIG. 5 is a schematic illustration of a graphical affordance in the form of a parameters dialog 500 for receiving code generation settings. Model configuration parameters may be organized into groups based on topic or subject, such as Solver, Data Import/Export, Optimization, Diagnostics, Code Generation, etc. The parameters dialog 500 may include a navigation pane 502 for navigating among the different groups of model configuration parameters. Selection of a Code Generation entry 504 from the navigation pane 502 causes a code generation parameters pane 506 to be included in the dialog 500. The code generation parameters pane 506 may include a plurality of window gadgets (widgets) for specifying one or more settings and/or options for the code generation process. For example, the code generation parameters pane may include a 'System target file:' data entry box 508 for specifying a target file, such as embedded target files, rapid simulation files, real-time execution files, etc., and a 'Language:' drop down menu command 510 through which a user may select a programming language for the generated code, such as C, C++, etc.

The code generation parameters pane 506 may further include a 'Toolchain:' drop down menu command 512 for use in selecting a toolchain to be used to build an executable or library, and a 'Build configuration:' drop down menu 514 for specifying an objective for the generated code. Exemplary objectives include execution efficiency, memory efficiency, traceability, debugging, safety efficiency, etc. The code generation parameters pane 506 also may include a 'Select objective:' drop down menu 516 for selecting an objective, such as 'Execution efficiency,' Memory efficiency, and 'Debugging', to be used with a Code Generation Advisor tool. The code generation parameters pane 506 may include a 'Check model before generating code:' drop down menu 518 for specifying whether to run checks from the Code Generation Advisor tool before generating code. The code generation parameters pane 506 may further include a 'Generate code only' checkbox button 520 for choosing between generating code and a makefile but not invoking the make command, or generating and compiling code to create an executable file. The code generation parameters pane 506 may further include a 'Package code and artifacts' checkbox 522 for specifying whether or not to package the generated code and artifacts for relocation.

The code generation parameters pane 506 also may include a code reuse area or portion 524 through which a user may designate and identify existing code for reuse during code generation. In some embodiments, the code reuse area 524 may include widgets for selecting code to be reused. For example, it may include checkboxes for the components of the system model 300 for which previously generated code may be reused. For example, the code reuse area 524 may include a first checkbox 526 for designating whether to reuse previously generated code for the first component 224, a second checkbox 528 for designating whether to reuse previously generated code for the second component 226, and a third checkbox 530 for designating whether to reuse previously generated code for the third component 228. In addition to checkboxes, the code reuse area 524 may include respective 'Folder location:' data entry boxes 532-534 and Browse buttons 536-538 for identifying the code to be reused, for example by specifying the location, e.g., within a file system, of files, objects, folders, or other containers containing the code to be reused. In some embodiments, the code to be reused may be identified in other ways, for example through a Uniform Resource Locator (URL) that points to an Internet location at which the code to be reused may be found.

The parameters dialog 500 also may include an 'OK' command button 540, a 'Cancel' command button 542, a 'Help' command button 544, and an 'Apply' command button 546 whose functions are well understood.

As indicated by the marked checkbox 526, the code generation settings may be specified to indicate that the previously generated code 230 for the first component 224 is to be reused when generating code for the system model 300. It should be understood that code reuse may be selected or specified in other ways. For example, the setting may be specified textually, in connection with the configuration parameters for the component model whose existing code is to be reused, etc.

The code generator 200 may save these settings for the system model 300. For example, the specified code generation settings may be aggregated with other settings for the system model 300, and stored in memory as a configuration set. Different configuration sets, having different code generation settings, may be created and saved for the system model 300. A configuration set having desired code generation settings may be selected when generating code for the system model 300.

FIGS. 4A-G are partial views of a flow diagram in accordance with an embodiment.

The modeling environment 100 may receive a command to generate code for the system model 300, as indicated at step 402. The command may be received from a user or it may be issued programmatically. For example, the modeling environment 100 may receive a command to perform some operation on the system model 300, and the performance of that operation may require code to be generated for the system model 300.

The code generator 200 may receive one or more settings to be used during the code generation process, as indicated at step 404. These settings may be specified by a user through the code generation parameters pane 506. In particular, the code generator 200 may receive an indication that existing code previously generated for one or more of the components 224, 226, and 228 is to be reused, rather than generating new code for that component when generating code for the system model 300, as further indicated at step 404.

In some embodiments, the indication to reuse code may be stored in or more data structures associated with the model, such as a configuration set, or in one or more data structures associated with the respective component, such as a properties page. The code generator may access the data structure, and determine that code is to be reused programmatically. The indication to reuse code also may be stored at locations external to the model. For example, the indication, such as one or more settings, may be stored at a model management tool. The code generator may access the model management tool and determine programmatically that code for a component is to be reused.

In addition, the code to be reused, including any associated artifacts, may be packaged. For example, the reused code and artifacts may be located at a root directory location. To designate the code and artifacts for reuse, the user may specify the root directory location. Alternatively or additionally, the reused code and artifacts may be collected and stored in an archive or other file or folder, or a manifest file also known as a bill of materials file may be created to contain or reference the reused code and artifacts. The user may designate this archive or manifest file thereby directing the code generator to reuse the code and artifacts.

The reused code 230 and/or 232 and the code 222 automatically generated for the system model 300 may be code corresponding to the same programming language or they may correspond to different programming languages. For example, the reused code 230 and/or 232 may be C source code, while the automatically generated code 222 may be C++, JavaScript, Java source code or HDL code.

The code integration engine 210 may determine whether the generated code designated for reuse, e.g., the generated code 230 for the first component 224, was generated by the same code generator as the code generator 200, which will be generating the code 222 for the system model 300, for example the same version or release, as indicated by decision step 406. If the code being reused was generated by the same code generator, then the code generator 200 may generate code for the system model 300 or a portion thereof, as indicated by Yes arrow 408 leading to step 410. The code generator 200 may not generate code for the component(s) of the system model 300 whose previously generated code is being reused, as indicated at step 412, and may instead include this previously generated code with the code generated for the system model, as indicated at step 414. In some embodiments, the code generator 200 may generate code, but then replace this generated code with the code being reused.

If the code being reused was generated by a different code generator, then the code integration engine 210 may determine the particular code generator used to generate the code being reused. For example, the code integration engine 210 may determine the particular tool, version, release, etc., as indicated by No arrow 416 leading to step 418. Information indicating the particular code generator may be included in the generated code 230 itself. For example, it may be contained in one or more make or other files, and the code integration engine 210 may examine this information to determine the identity of the code generator that created the generated code 230 being reused. Alternatively, the code integration engine 210 may examine the code 230 being reused and based on its structure, on one or more artifacts 212 associated with the code 230, such as data files generated during the code generation process, and/or on other characteristics, determine the particular code generator that created the code 230 being reused.

Newer versions or releases of a code generator may include changes or updates that alter or affect the interface of generated code. For example, the number of variables or the manner in which variables are named within generated code may change from one version or release of a code generator to the next. In addition, the way in which functions or function arguments are named may also be changed. Also, new or different names may be used for global variables, which may appear in expressions included in a component, and may thus be included in the generated code for the component. In addition to changing the names of functions, arguments, and/or variables, different versions or releases of a code generator may create more or fewer entry points, functions, arguments, and/or variables, or may change the type, dimension, or other attributes of variables.

Different code generators may also generate model, component, model element, and/or state chart parameter names or property names or attributes differently. Different code generators may also generate different build or other files, such as different header files, and may change the contents of header or other files. For example, different versions or releases may place shared utility source files in different locations in the generated code. Furthermore, a code generator designed to generate code for an embedded target may generate a call interface differently than a code generator designed to generate code for a non-embedded target, such as a generic target.

An example of a tool that generates code intended for an embedded target is the Embedded Coder product from The MathWorks, Inc., while an exemplary tool that generates code for a generic real-time environment is the Simulink Coder product also from The MathWorks, Inc. Other code generators include the MATLAB Coder tool from The MathWorks, Inc., the NI LabVIEW C Generator from National Instruments Corp. of Austin, Tex., and the AUTOSAR Builder system from Dassault Systemes of France, among others.

A code generator also may create one or more shared utility source files when generating code for a model, portion thereof, or a component. The shared utility source files may contain functions, type definitions, macro definitions, etc. that may be used by other portions of the generated code. The other portions of the generated code may issue calls to access the functions, type definitions, and macro definitions stored in the shared utility files. Shared utility functions may be optimized versions of common algorithmic functions, such as Fast Fourier Transforms (FFTs), convolutions, etc. The particular shared utility source files created by a code generator may change with different versions or releases of the code generator. These changes may include optimizations, coding style changes, bug fixes, new locations for the shared utility source files, etc. Shared utility source files generated by different code generators may be collected and stored in the repository 214. For example, shared utility source files associated with the code 230 being reused as well as shared utility source files associated with the code 222 being generated may be stored in the repository 214. In some embodiments, the shared utility source file repository 214 may be stored in the source code repository 234.

The code generation process may include several stages and/or steps. For example, the front-end processing unit 202 may perform preliminary tasks, such as capturing dataflow relationships, identifying input/output dependency relations, etc., specified in the system model 300, determining block semantics, such as the type of block, determining particular block and/or component parameter settings, performing type checking and data propagation, determining an execution order of the components and model elements, etc. This information may be provided by the front-end processing unit 202 to the Intermediate Representation (IR) generator 204.

In some embodiments, the IR generator 204 may generate a series of in-memory representations, such as Intermediate Representations (IRs), of the system model 300 or portion thereof. The IR generator 204 may construct an early IR that directly corresponds to the system model 300. The early IR may include a plurality of nodes interconnected by edges. The nodes may correspond to model elements, and the edges may correspond to the signals or other relationships among model elements. The IR generator 204 may perform a series of transforms starting with the early IR, producing one or more transitional IRs and a final IR. The particular transforms that are applied may depend on the settings specified for the code generation process. For example, different transforms may be used depending on the specified objective for the generated code.

The IRs may be in the form of a Control Flow Graph (CFG), Control Data Flow Graph (CDFG), program structure tree (PST), abstract syntax tree (AST), etc. A CDFG may capture the control flow as well as the data flow of a graphical model through data dependency and control dependency edges. One or more of the IRs may be saved to memory.

Figure 4A:
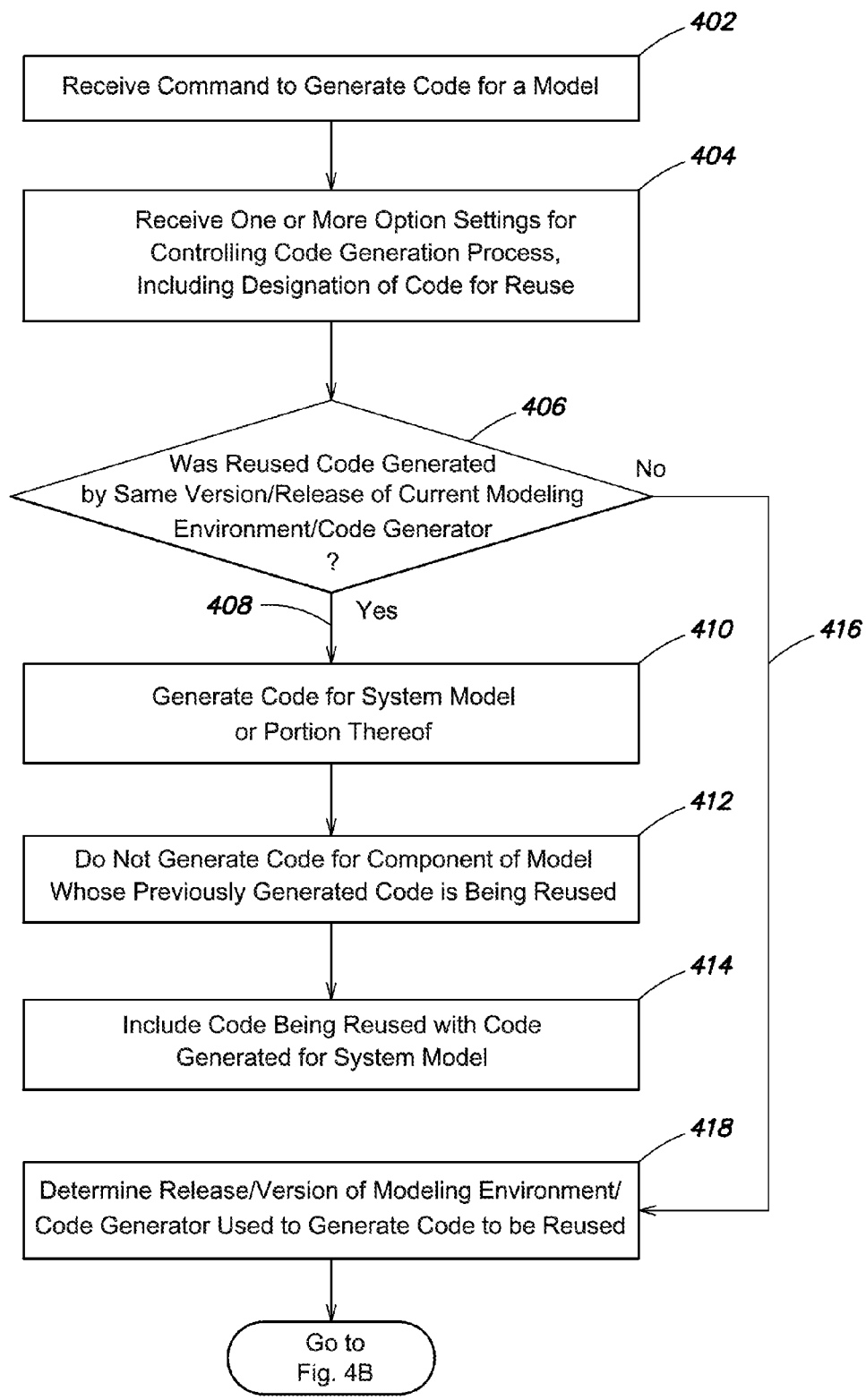
FIGS. 4A-G are partial views of a flow diagram in accordance with an embodiment.
Figure 4B:
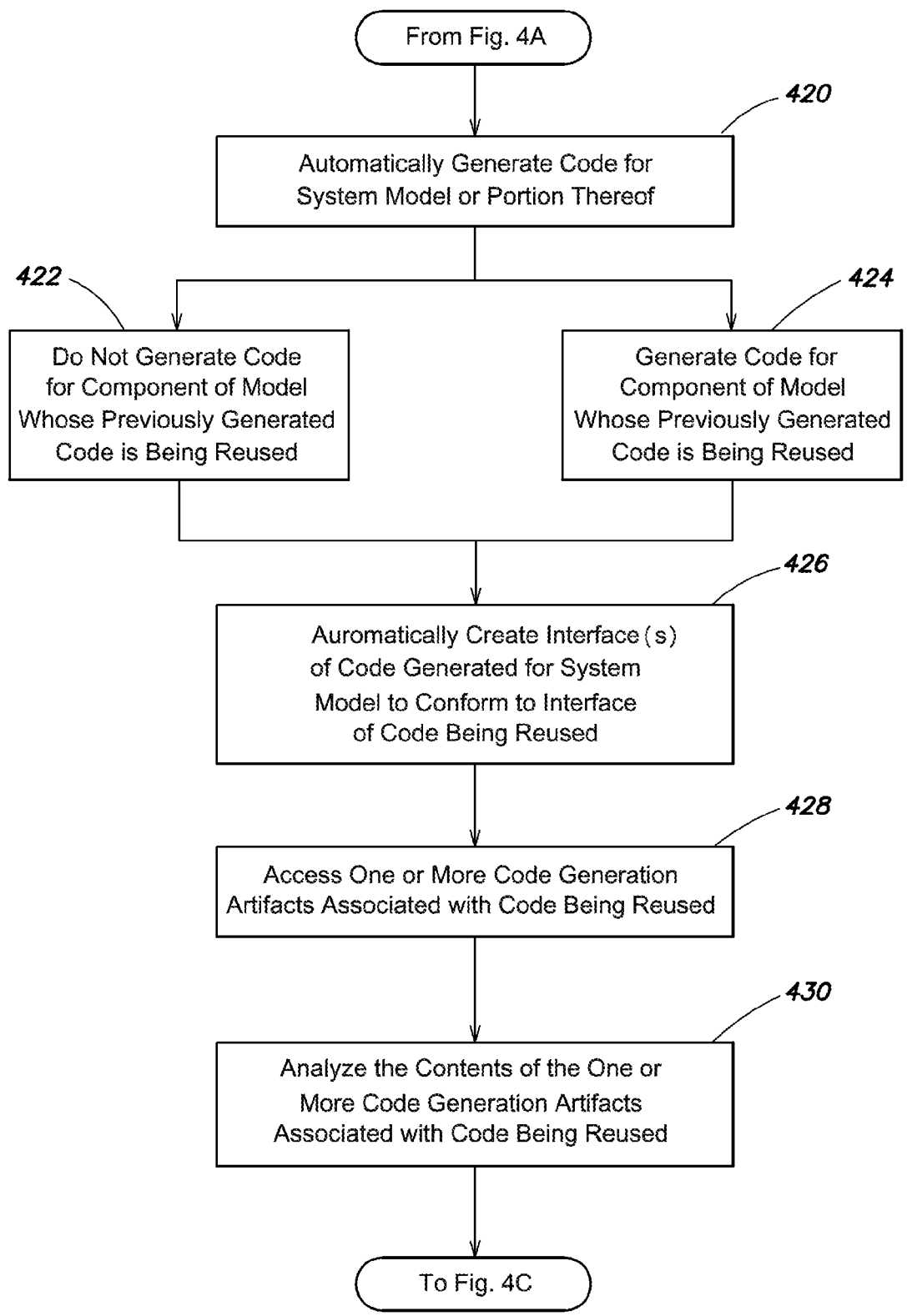

The back-end processing unit 206 may interface with the IR generator 204 to generate the code 222 for the system model or at least a portion thereof from the final IR, as indicated at step 420 (FIG. 4B).

A code generator may generate code for model elements and components in an order opposite to the execution order. That is, code generation may start with the components and model elements at the end of the execution order, and end with the components and model elements at the start of the execution order. In addition, a code generator may create one or more artifacts that contain information regarding the interfaces constructed for the code generated for the components of a model. As the code generator proceeds to generate code, it may access the one or more artifacts when determining how to construct calls to different portions of the generated code, such as a call from the code generated for one component to the code generated for another component.

The code generator 200 may not generate code for those components of the system model 300 for which previously generated code is to be reused, as indicated at step 422. Nonetheless, in some embodiments, the code generator 200 may also generate code for the component whose previously generated code is being reused, as indicated at step 424. This generated code may be tested against the code 230 that is being reused. The code 222 that is automatically generated for the system model 300 may include a portion that interfaces to the code 230 being reused, which was generated by a different code generator.

In some embodiments, the code integration engine 210 may construct interfaces of the automatically generated code 222 for the system model 300 so that the interfaces conform to the interface of the code 230 being reused, as indicated at step 426. For example, the code integration engine 210 may add, modify, or remove one or more functions, statements, operations, procedures, or methods to the interface defined in the automatically generated code 222. The one or more functions, statements, operations, procedures, or methods may perform the required conversions for accessing the code 230 being reused directly from the code 222 generated for the system model 300.

Figure 4C:
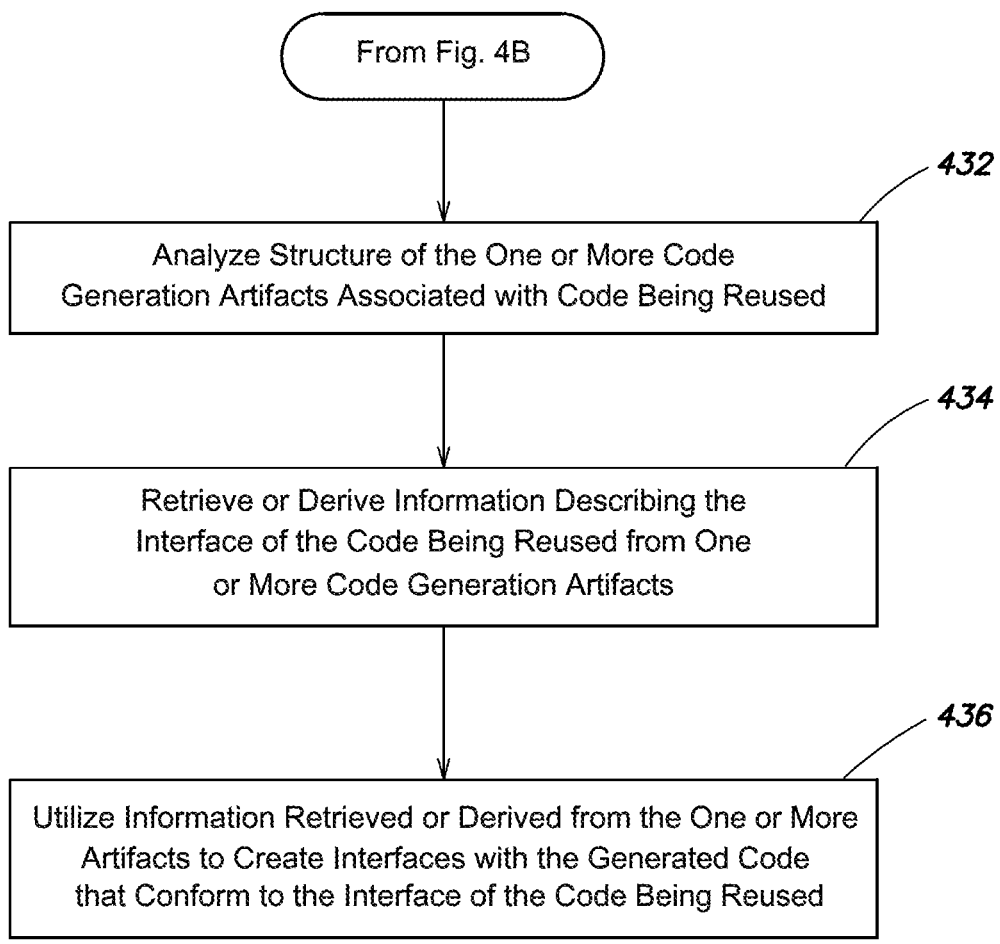

The artifact analysis engine 215 may access the one or more artifacts 212 associated with the code 230 being reused when generating the code 222 for the system model 300, as indicated at step 428. The artifact analysis engine 215 may analyze the contents of the one or more artifacts 212, as indicated at step 430, and may analyze and interpret the structure of the one or more of the artifacts 212, as indicated at step 432 (FIG. 4C). Based on its processing of the one or more artifacts 212, the artifact analysis engine 215 may derive information regarding the interface of the code 230 being reused, as indicated at step 434. The code integration engine 210 may then utilize this information when creating interfaces to the reused code 230 within the generated code 222 for the system model 300, as indicated at step 436.

Suppose, for example, the code generator 200 reaches a point in the code being generated for the system model 300 that requires a call to initialize the code 230 being reused. The code integration engine 210 may access the information obtained by the artifact analysis engine 215 from the one or more artifacts associated with the code 230 being reused. This information may indicate the manner by which the code 230 being reused is to be initialized. For example, the obtained information may indicate that the function name for initializing the code 230 being reused is or includes 'mabstime_mr_mt_c_initialize'. The code generator 200 may then construct a call according to this information, and include this form of the call in the code 222 being generated for the system model 300. For example, the code generator 200 may use the 'mabstime_mr_mt_c_initialize' function name in the code being generated for the system model 300. But for this information, the code generator 200, which is a different code generator than the one used to generate the code 230 being reused, might have otherwise used a different function name, e.g., 'mabstime_mr_m_intialize', in this instance.

In some embodiments, the artifact analysis engine 215 may need to access multiple artifacts associated with the code 230 to obtain the information needed to construct the interfaces of the generated code 222. For example, the build info data structure 236 may include information regarding function names for entry points to the code 230 being reused, while the model interface data structure 238 may include information regarding the arguments of these entry points. The model interface data structure 238 associated with the code 230 being reused may indicate that a function call to the code 230 being reused requires two arguments: 'GlobalTID0' and 'Out1'. The code generator 200 may include both arguments when constructing a call, within the code being generated for the system model 300, to the code 230 being reused. But for the information derived from the one or more artifacts 212 associated with the code 230 being reused, the code generator 200 might have otherwise only included a single argument, e.g., 'Out1'.

Information derived for the interface of the code 230 being reused may be based on the structure of the one or more artifacts 212. For example, by analyzing one or more of the artifacts 212 associated with the code 230 being reused, the artifact analysis engine 215 may determine that an 'initialize' function is used to both initialize the code 230 being reused, and to reset the code 230 being reused to its initial state. The code generator 200, which may represent a more recent release than the code generator used to generate the code 230 being reused, might otherwise use two separate functions, e.g., an 'initialize' function and a 'reset' function depending on the job, activity, or task to be performed. When generating code for the system model 300 to reset the code 230 being reused, the code integration engine 210, however, may utilize the 'initialize' function as specified by the structure of the one or more artifacts associated with the code 230 being reused, rather than a 'reset' function, which the code generator 200 might otherwise employ. In this way, the code generator 200 may generate the code 222 for the system model 300 in a way that comports with the interface of the code 230 being reused.

In some embodiments, the artifact analysis engine 215 may also analyze one or more code generation artifacts associated with the code 222 being generated for the system model 300, and this information may also be used in creating the interface(s) to the code 230 being reused.

Figure 4D:
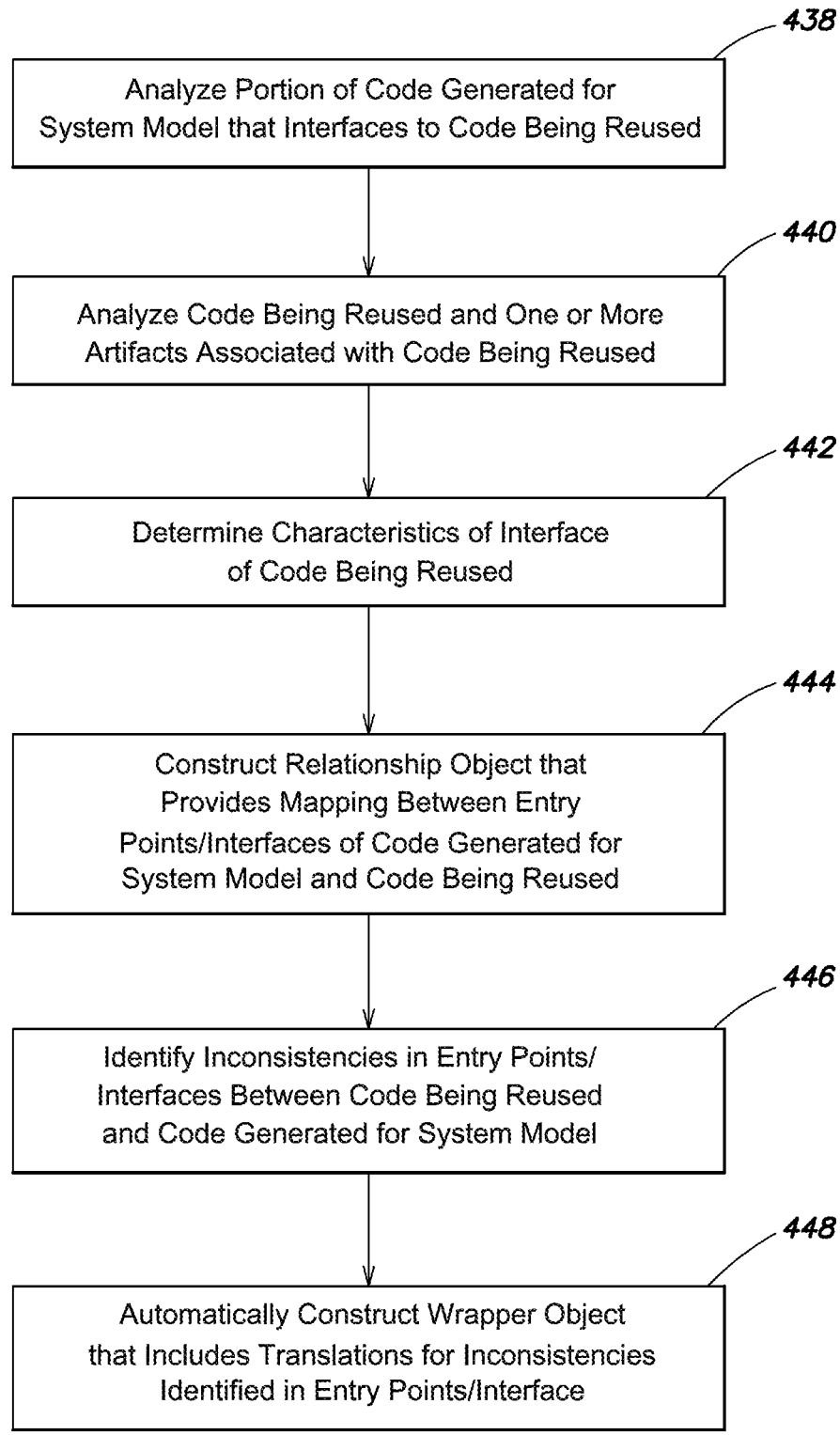

In some embodiments, the code generator 200 may generate the code 222 for the system model 300 or a portion thereof as though the code 230 being reused was also generated by the same code generator 200. However, because the code 230 being reused was actually generated by a different code generator, there may be one or more inconsistencies between the code 222 generated for the system model 300 and the code 230 being reused. The code integration engine 210 may analyze a portion of the code 222 generated for the system model 300, e.g., that portion of the code 222 that interfaces to the code 230 being reused, as indicated at step 438 (FIG. 4D). The code integration engine 210 may also analyze the interface of the code 230 being reused, and the one or more artifacts 212 associated with the code 230 being reused, as indicated at step 440.

The interface analysis engine 216 may determine the characteristics of the interface of the code 230 being reused, as indicated at step 442. In addition, the interface analysis engine 216 may construct a relationship object, such as the interface map 600, that maps portions or elements of the interface of the code 230 being reused to portions or elements of the interface of the code 222 generated for the system model 300, as indicated at step 444. The relationship object may be stored in memory as one or more data structures.

Interface Map

Figure 6B:
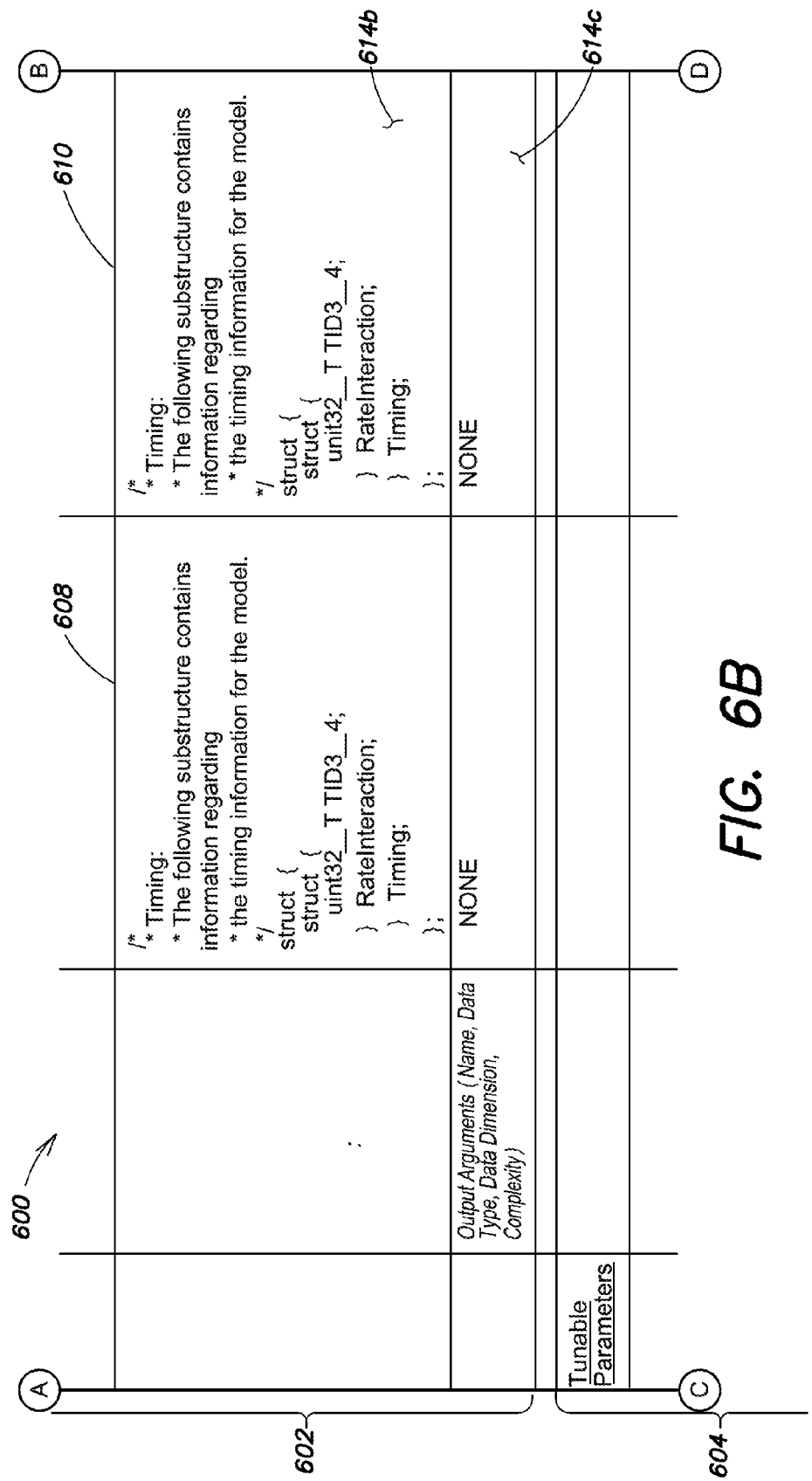

FIGS. 6A to 6C are partial views of a schematic illustration of the interface map 600. In some embodiments, the interface map 600 may be organized as a table having a plurality of columns and rows whose intersections define cells or records for storing information. The interface map 600 may have a first section 602 for storing information concerning functions and a second section 604 for storing information concerning tunable parameters. A tunable parameter refers to a model variable whose value may be changed, during initialization or during later stages of execution of the model, by writing directly to a memory location or via an accessor function. The value of a tunable parameter may be changed programmatically or through user input, e.g., through a graphical affordance, such as a dial, slider, data entry box, etc. The interface map 600 also may include columns for the code that is being reused and the code that is being generated for the system model 300. For example, the interface map 600 may include a first column 608 that corresponds to the previously generated code 230 for the first component 224, which is being reused, and a second column 610 that corresponds to the code 222 being generated for the system model 300.

The sections 602 and 604 may include one or more rows for storing information concerning particular functions and tunable parameters. For example, the first section 602 may include three rows 612a-c for a first entry function identified as 'mabstime_mr_mt_combined_refTID0'. The first row 612a may include the name of the function in both the previously generated code 230 and the new code 222 being generated. The second row 612b may include information regarding the function's input arguments, such as name, data type, data dimension, and complexity, in both the previously generated code 230 and the new code 222 being generated. The third row 612c may include information regarding the function's output arguments, if any, such as name, data type, data dimension, and complexity, in both the previously generated code 230 and the new code 222 being generated.

The first section 602 also may include three rows 614a-c for a second function identified as 'mabstime_mr_c_initialize' in the previously generated code 230. The first row 614a may include the name of the function in both the previously generated code 230 and the new code 222 being generated. The second row 614b may include information regarding the function's input arguments, such as name, data type, data dimension, and complexity, in both the previously generated code 230 and the new code 222 being generated. The third row 614c may include information regarding the function's output arguments, if any, such as name, data type, data dimension, and complexity, in both the previously generated code 230 and the new code 222 being generated.

The second section 604 may include rows, such as row 634, for the tunable parameters specified in the previously generated code 230 and in the new code 222 being generated. The row 634 may include information, such as name, data type, data dimension, and complexity, for each tunable parameter.

The code integration engine 210 may analyze the interface map 600, and identify any inconsistencies between the interface of the code 230 being reused and the interface of the code 222 being generated, as indicated at step 446. Exemplary inconsistencies include changes in entry function names, changes in function arguments, different entry functions, etc. For example, the wrapper constructor 218 of the code integration engine 210 may identify occurrences where different function names are used at the interface. Referring to row 614a (FIG. 6A), the wrapper constructor 218 may determine that the release or version used to generate the code 230 created a function named 'mabstime_mr_c_intialize', while the code generator 200 creates a function named 'mr_mabstime_mr_m_intialize'. In this case, the wrapper constructor 218 may include one or more functions, statements, operations, procedures, methods, etc. that convert references to the 'mr_mabstime_mr_m_initialize' function in the code 222 being generated to references to the 'mabstime_mr_c_initialize' function of the code 230 being reused.

The wrapper constructor 218 may also identify the use of different arguments, different argument names, or different argument attributes at the interface. Referring to row 612b (FIG. 6A), the wrapper constructor 218 may determine that the release or version used to generate the code 230 expects an input argument: 'tid' for the 'mabstime_mr_mt_combined_refTID0' function, whereas the code generator 200 does not expect any input arguments for the 'mabstime_mr_mt_combined_refTID0' function. In this case, the wrapper constructor 218 may include one or more functions, statements, operation, procedures, methods, etc. that NULL the 'tid' input argument in the code 230 that is being reused.

Referring to row 614b (FIG. 6A), the wrapper constructor 218 may determine that the release or version used to generate the code 230 expects the argument 'const char_T  errorStatus:' as indicated at 615a, whereas the code generator 200** expects the argument 'const uint32_T * errorCode'. The wrapper constructor 218 may include one or more functions, statements, operations, procedures, methods, etc. for performing a conversion between these arguments.

Referring to row 634 (FIG. 6B), the wrapper constructor 218 may determine that accessor functions may be required to read or write a tunable parameter. For example, the release or version used to generate the code 230 may include a tunable parameter 'unit8_T rtP_Increment', as indicated at 635a (FIG. 6B). In order to read this tunable parameter, a first accessor function, as indicated at 635b, may need to be created. In order to write this tunable parameter, a second accessor function, as indicated at 635c, may need to be created. In the rightmost column 610 (interface of code being generated), the parameter is declared with the "static" qualifier; this restricts visibility of the parameter from outside of the source file, and the parameter can therefore only be read from or written to via the getParam/setParam accessor functions. In the code being reused, the parameter rtP_increment does not have the static qualifier, and is therefore globally visible. Hence the code being generated can access the parameter as follows:

```
/* Write a new value to the parameter */
rtP_increment=51;
/* Read the parameter value*/
current value=rtP_increment;
```

Suppose the interface for the tunable parameter of the code being reused was of the form shown in the rightmost column 610 of row 634. In this case, the code being generated may access the tunable parameter as:

```
/* Write a new value to the parameter */
setParam_rtP_increment(51);
/* Read the parameter value*/
current value=getParam_rtP_increment( );
```

In some embodiments, the interface map 600 may include other or additional sections. For example, an interface map may further include a section for initialization settings and a section for global variables, among others.

The wrapper constructor 218 may construct one or more wrapper functions 700 to allow reuse of the code 230 generated with a different code generator, as indicated at step 448. The wrapper constructor 218 may access and evaluate the interface map 600 to determine how to construct the one or more wrapper functions 700.

FIG. 7A is a schematic illustration of a function call site 702 that may be included in the code 222 generated for the system model 300 by the code generator 200. The function call site may specify a model initialize function, such as 'mabstime_mr_mt_c_initialize', as indicated at 704.

FIG. 7B is a schematic illustration of the wrapper function 700. The wrapper function 700 may implement a bridge between the function call site 702 in the code 222 generated for the system model 300 and the function definition included in the generated code 230 being reused. The wrapper function 700 may take its own input arguments and pass them directly to the generated code 230 being reused without conversion.

Figure 4E:
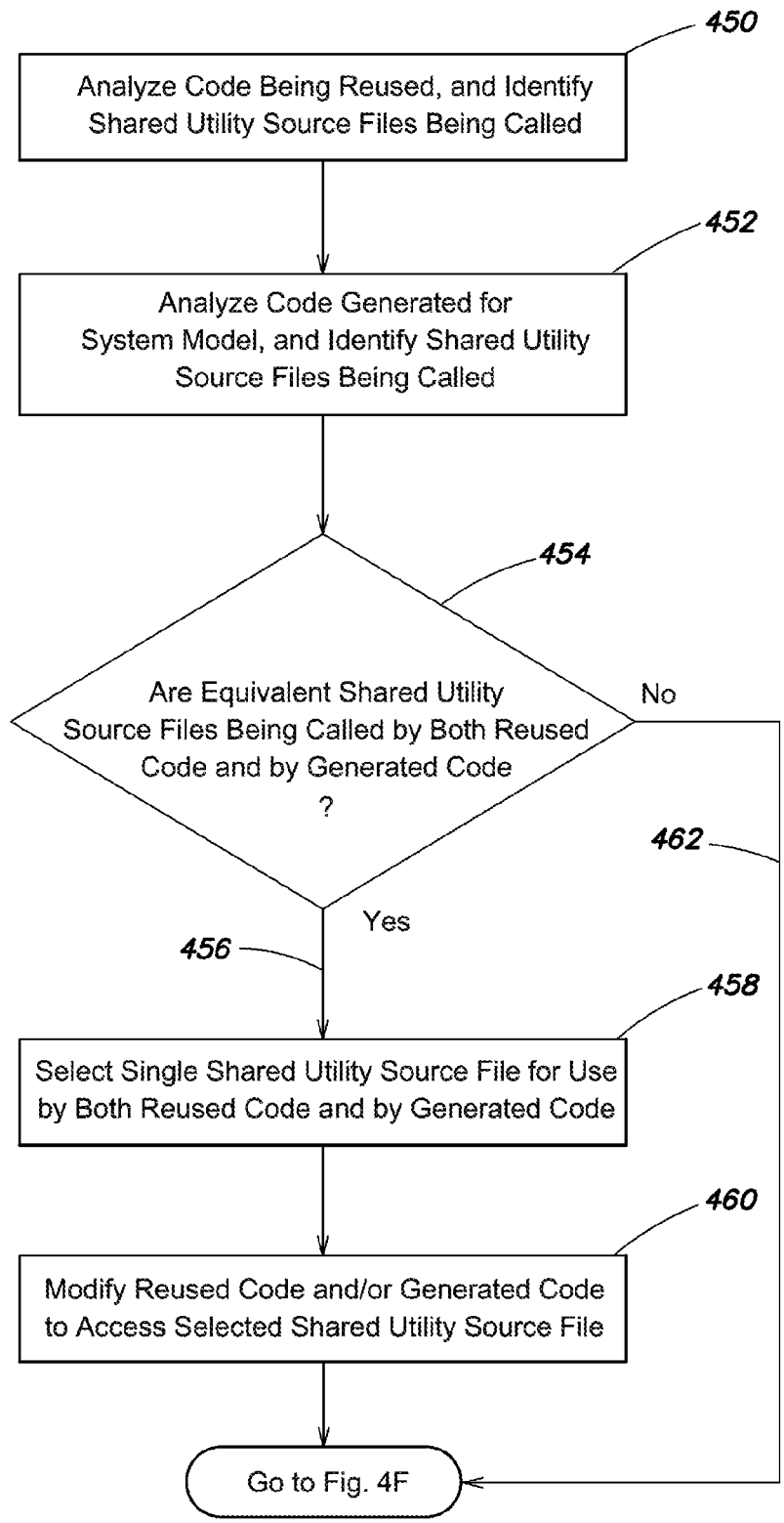

In addition to creating interfaces conforming to the reused code 230 and/or creating one or more wrapper functions 700, the code integration engine 210 may identify one or more shared utility source files called by the code 230 being reused, as indicated at step 450 (FIG. 4E). Code generated for a model, a portion thereof, or a component may call shared utility source files that were generated by the same code generator that generated the code for the model, portion thereof, or component. The code integration engine 210 may also identify one or more shared utility source files called by the automatically generated code 222 for the system model 300, as indicated at step 452. The shared utility selector 220 may determine whether any of the shared utility source files being called by the code 230 being reused and the code 222 automatically generated for the system model 300 are operatively equivalent, e.g., perform an equivalent function, provides an equivalent type definition, or provides an equivalent macro definition, as indicated at decision step 454. When the shared utility selector 220 detects calls to equivalent shared utility source files, the shared utility selector 220 may automatically select a single shared utility source file from the repository 214 to be included in the code 222 for the system model 300, as indicated by Yes arrow 456 leading to step 458. For example, the shared utility selector 220 may select the shared utility source file as generated by the code generator 200 that automatically generated code 222 for the system model 300, or the shared utility source file generated by the code generator that generated the code 230 being reused. The shared utility selector 220 may designate the selected shared utility source file as a primary version of the respective shared utility source file. Depending on which shared utility source file is selected, the code integration engine 220 may modify the automatically generated code 222 for the system model 300 or the code 230 being reused, if necessary, in order to access the selected shared utility source file, as indicated at step 460.

The shared utility selector 220 may manage shared utility code such that:

Shared utility source files having non-functional differences (e.g. coding style changes from one release to the next) may be reused;

Cross-release integration avoids symbol name conflict that may occur if attempting to link or integrate definitions of the same symbol name across different shared utility source files, e.g., avoiding shared utility source files where function, type, macro, or other symbol name clash may occur or result; and In selecting a cross-release implementation of a shared utility source file, the code generator may ensure the implementation being reused is equivalent to the implementation expected at each point (corresponding to code generated in different releases) where the shared utility source file is referenced.

In some embodiments, the shared utility selector 220 may query the repository 214 to determine whether an implementation of a pre-existing shared utility source code file may be used in place of a default shared utility source file newly created by the code generator. The repository 214 may include replacement sites and shared code replacement entries. The replacement sites may include properties of default shared utility source code files suitable for replacement. The properties may include the name of the default shared utility source code file;

the file's contents (ignoring comments and white space);

hardware characteristic (e.g. native word size) for which the shared utility source file is intended to be compiled; and additional attributes that capture the functionality implemented by the shared utility source file.

The shared code replacement entries may provide a mapping between replacement sites and pre-existing shared utility source code files. The shared utility selector 220 utilizes the properties of the replacement sites to query the repository 214 to identify a pre-existing shared utility source file to be used as a replacement for a default shared utility source file. The repository 214, including the replacement sites and the shared code replacement entries, may be maintained by a library administrator. The library administrator may review shared utility source code files produced by different code generators, and create the replacement sites and the shared code replacement entries to indicate the scope or type of differences between shared utility source code files created by different code generators. For example, the library administrator may indicate when the differences between shared utility source code files created by two code generators are non-functional, e.g., optimizations or coding style changes, thus permitting the pre-existing shared utility source code file to be used in place of a default shared utility source code file.

If equivalent shared utility source files are not identified, then steps 458 and 460 may be skipped, as indicated by No arrow 462.

Figure 8:
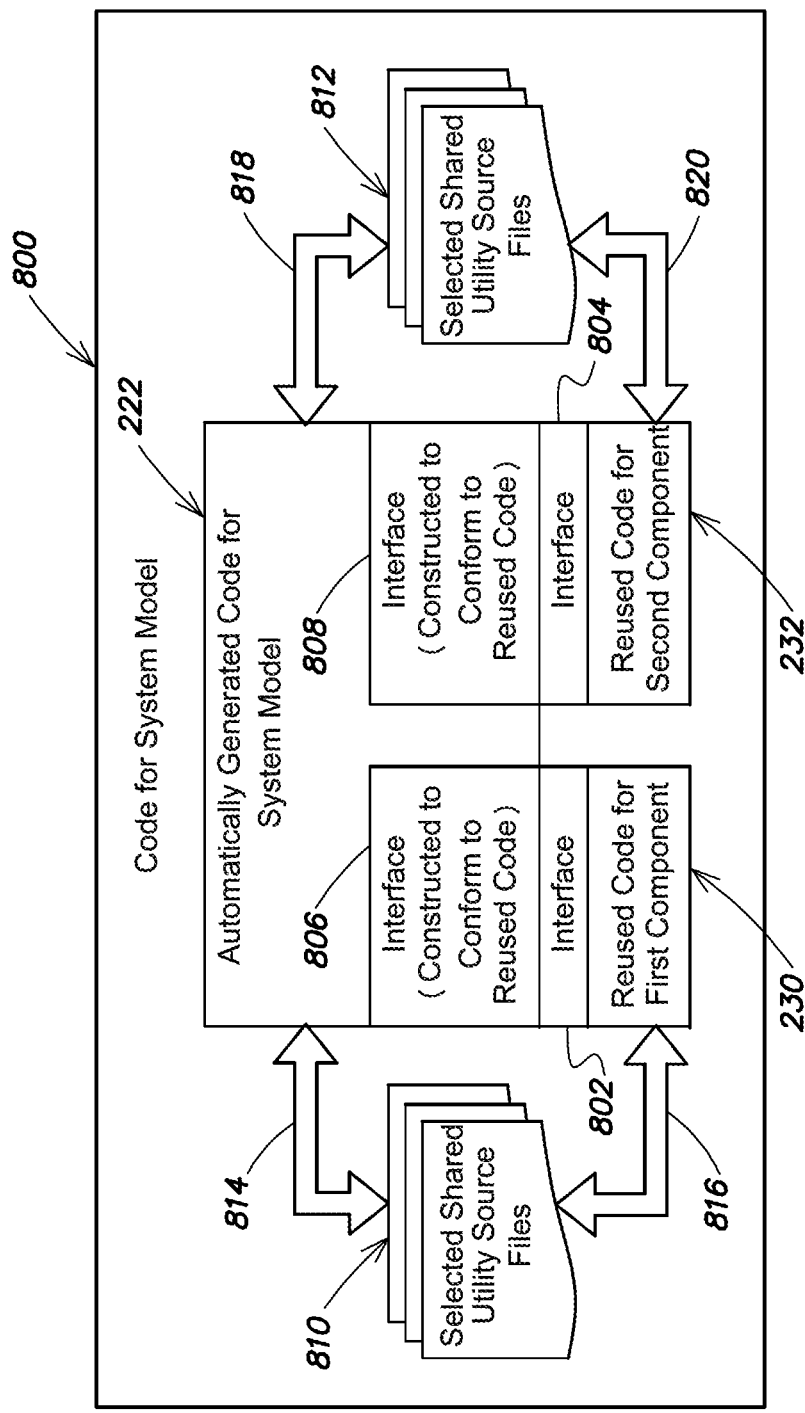
FIG. 8 is a schematic diagram of code for a system model in accordance with an embodiment.

FIG. 8 is a schematic diagram of the integrated code 800 for the system model 300, according to an embodiment. Suppose, for example, that the existing code 230 for the first component 224 and the existing code 232 for the second component 226 are being reused. The integrated code 800 may include the automatically generated code 222 for at least a portion of the system model 300, the reused code 230 for the first component 224, and the reused code 232 for the second component 226. The reused code 230 and 232 may include respective interfaces 802 and 804. In addition, the automatically generated code 222 may include interfaces 806 and 808 to the reused code 230 and 232. The interfaces 806 and 808 of the automatically generated code 222 have been constructed or modified to conform to the interfaces 802 and 804 of the reused code 230 and 232. The integrated code 800 may also include one or more selected shared utility source files, such as first and second files 810 and 812. The automatically generated code 222 and the reused code 230 may access the first shared utility source files 810, as indicated by first and second arrows 814 and 816, while the automatically generated code 222 and the reused code 232 may access the second shared utility source files 812, as indicated by third and fourth arrows 818 and 820.

Figure 9:
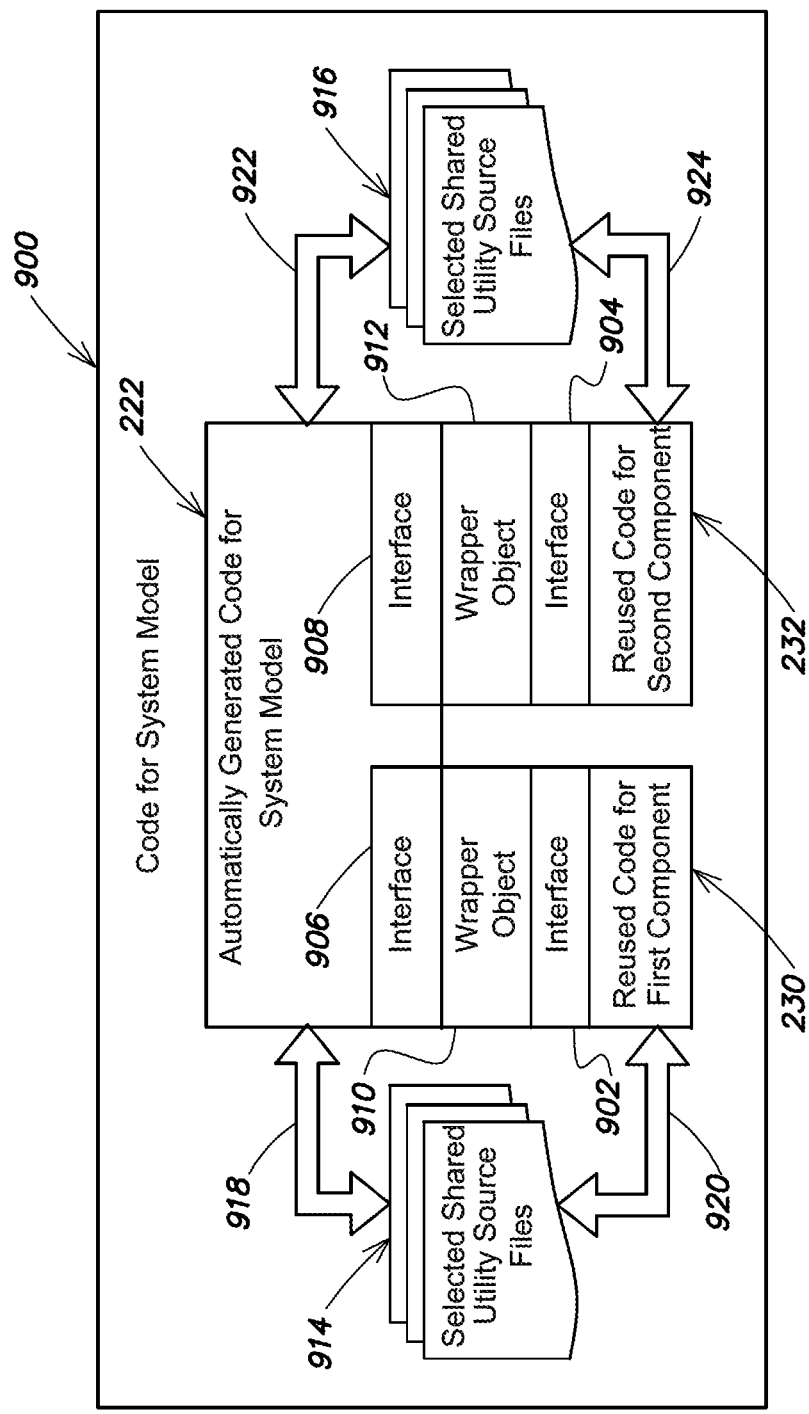
FIG. 9 is a schematic diagram of code for a system model in accordance with another embodiment.

FIG. 9 is a schematic diagram of integrated code 900 for the system model 300, according to another embodiment. The integrated code 900 includes the automatically generated code 222 for at least a portion of the system model 300, the reused code 230 for the first component 224, and the reused code 232 for the second component 226. The reused code 230 and 232 includes respective interfaces 902 and 904, and the automatically generated code 222 includes interfaces 906 and 908 to the reused code 230 and 232. In addition, the integrated code 900 includes first and second wrapper objects 910 and 912 that allow the automatically generated code 222 to interface with the reused code 230 and 232. The integrated code 900 may also include one or more selected shared utility source files, such as first and second files 914 and 916. The automatically generated code 222 and the reused code 230 may access the first shared utility source files 914, as indicated by first and second arrows 918 and 920, while the automatically generated code 222 and the reused code 232 may access the second shared utility source files 916, as indicated by third and fourth arrows 922 and 924.

It should be understood that different embodiments may be combined. For example, the code integration engine 210 may construct or modify the interface of the code 222 generated for the system model 300 to conform to the interface of a first reused code segment, such as the reused code 230, while creating one or more wrapper objects to interface with a second reused code segment, such as the reused code 232.

In some embodiments, the generated code 222 for the system model 300 may represent a mid-level component that itself is called by a higher level system code, such as top-level system code.

Figure 4F:
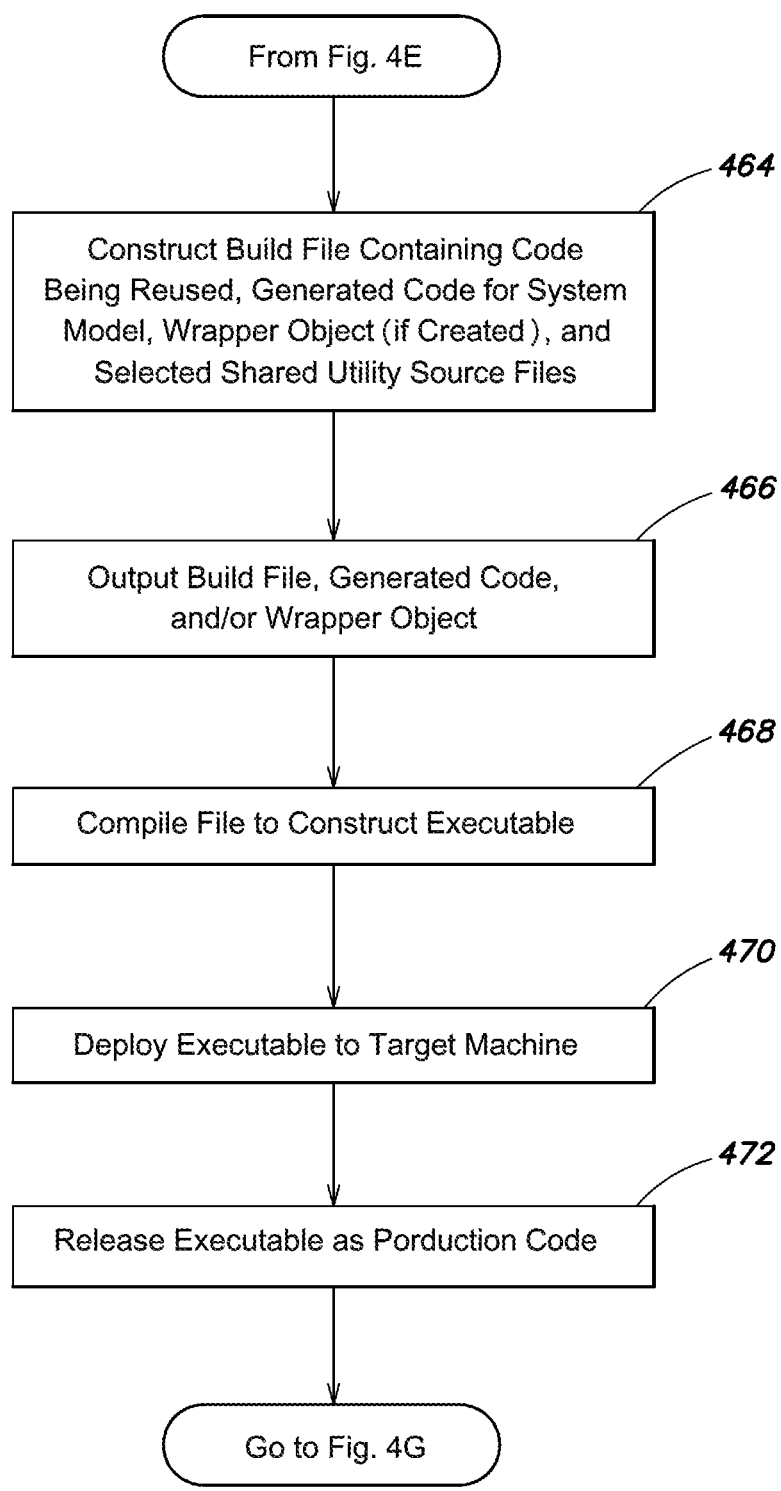

The code generator 200 may construct one or more build files that contain: the previously generated code 230 that is being reused, the code 222 generated for the system model 300, the one or more wrapper objects 700, and the selected shared utility source files, one or more of which may be in the form of source code, as indicated at step 464 (FIG. 4F). The previously generated code 230 and the generated code 222 may be in source code form. The code generator 200 may output the one or more build files representing the integrated code 800, as indicated at step 466.

Figure 4G:
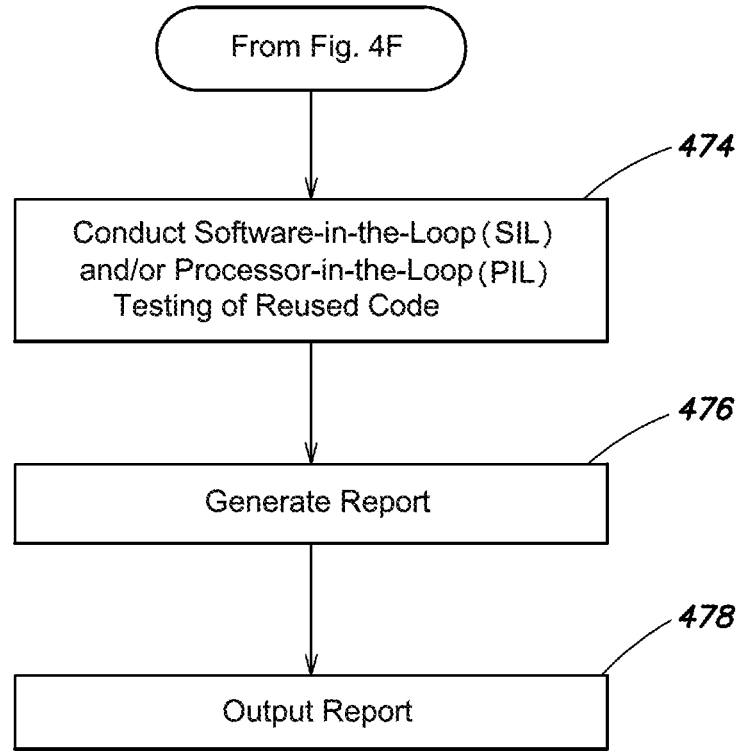

The compiler 110 may access the build file, and compile the previously generated code 230, the code 222 generated for the system model 300, and the one or more wrapper functions 700, if any, to create an executable, which may be in the form of object code, as indicated at step 468. In some embodiments, the previously generated code may already be available as compiled and verified object code. The compiled and verified object code may be available as a standalone object code file or it may be located within a library archive file or other data structure. In this case, the previously generated code 230 may not be recompiled, and instead the compiled and verified object code may be utilized directly. The executable may be deployed onto a target machine, and executed, as indicated at step 470. The executable also may be released as production code, as indicated at step 472. In an embodiment, Software-in-the-Loop (SIL) or Processor-in-the-Loop (PIL) testing may be performed on the previously generated code 230 that is being reused, as indicated at step 474 (FIG. 4G). For example, the generated code 222 for the system model 300 and the one or more wrapper objects 700, if any, may be compiled by the compiler 110 and loaded onto a host machine. The previously generated code 230 may be compiled and loaded onto a test or evaluation platform, such as a programmable hardware device, a Digital Signal Processor, etc., that is in communication with the host machine. The generated code for the system model 300 and the one or more wrapper objects 700 may be run on the host machine, while the previously generated code 230 may be run on the test or evaluation platform or hardware.

The report generator 208 may create a report, as indicated at step 476. The report generator 208 may output the report, e.g., by displaying it on a display or sending it to a printer, as indicated at step 478. The report may include information concerning identity of the code generator that generated the reused code, for example the product name and the release or version number, the inconsistencies identified in the interface of the code 230 being reused, the transformations used to account for those inconsistencies, and the selected shared utility source files, among other information.

Figure 10A:
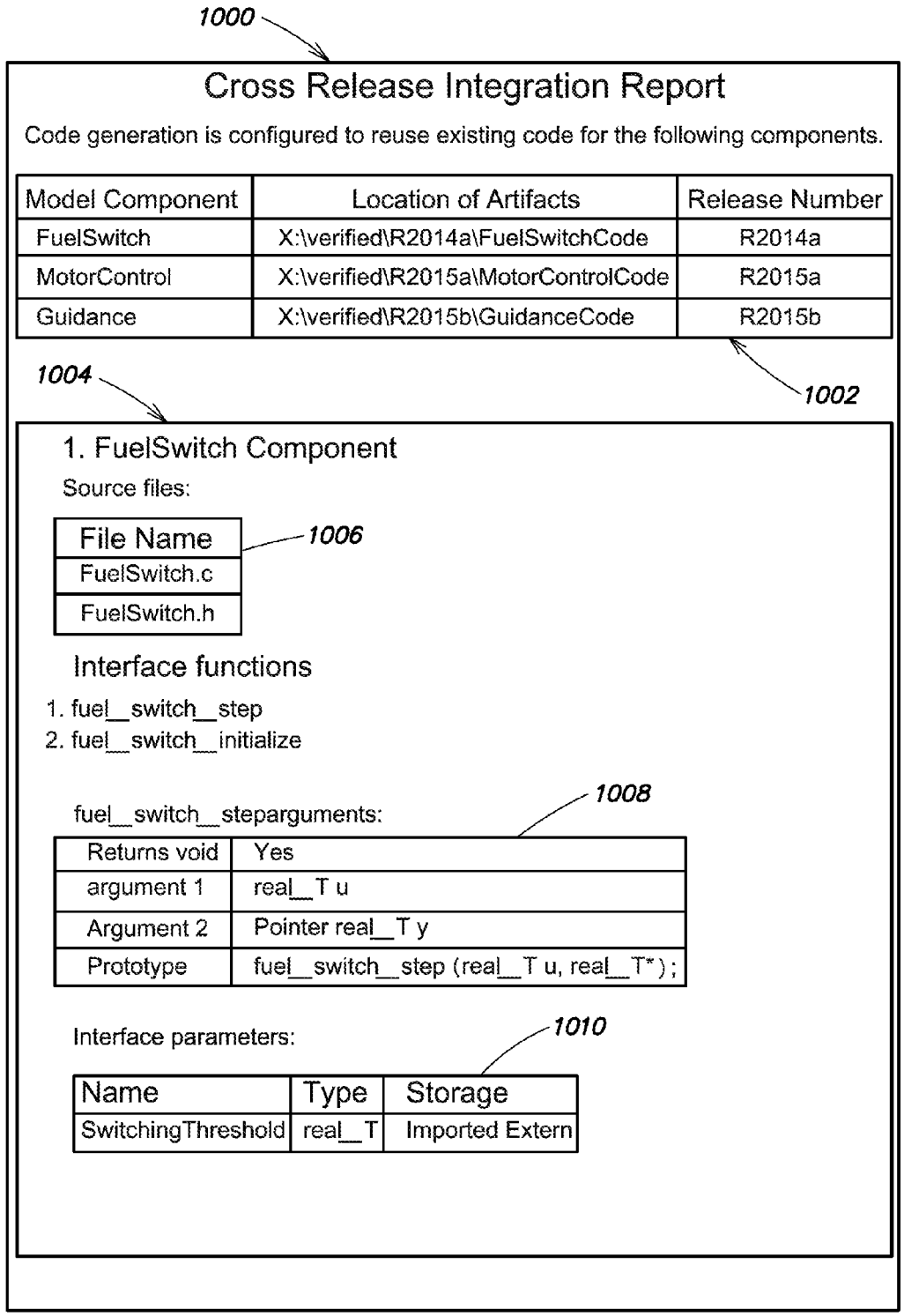
FIGS. 10A and 10B are partial views of a schematic illustration of an interface report in accordance with an embodiment.
Figure 10B:
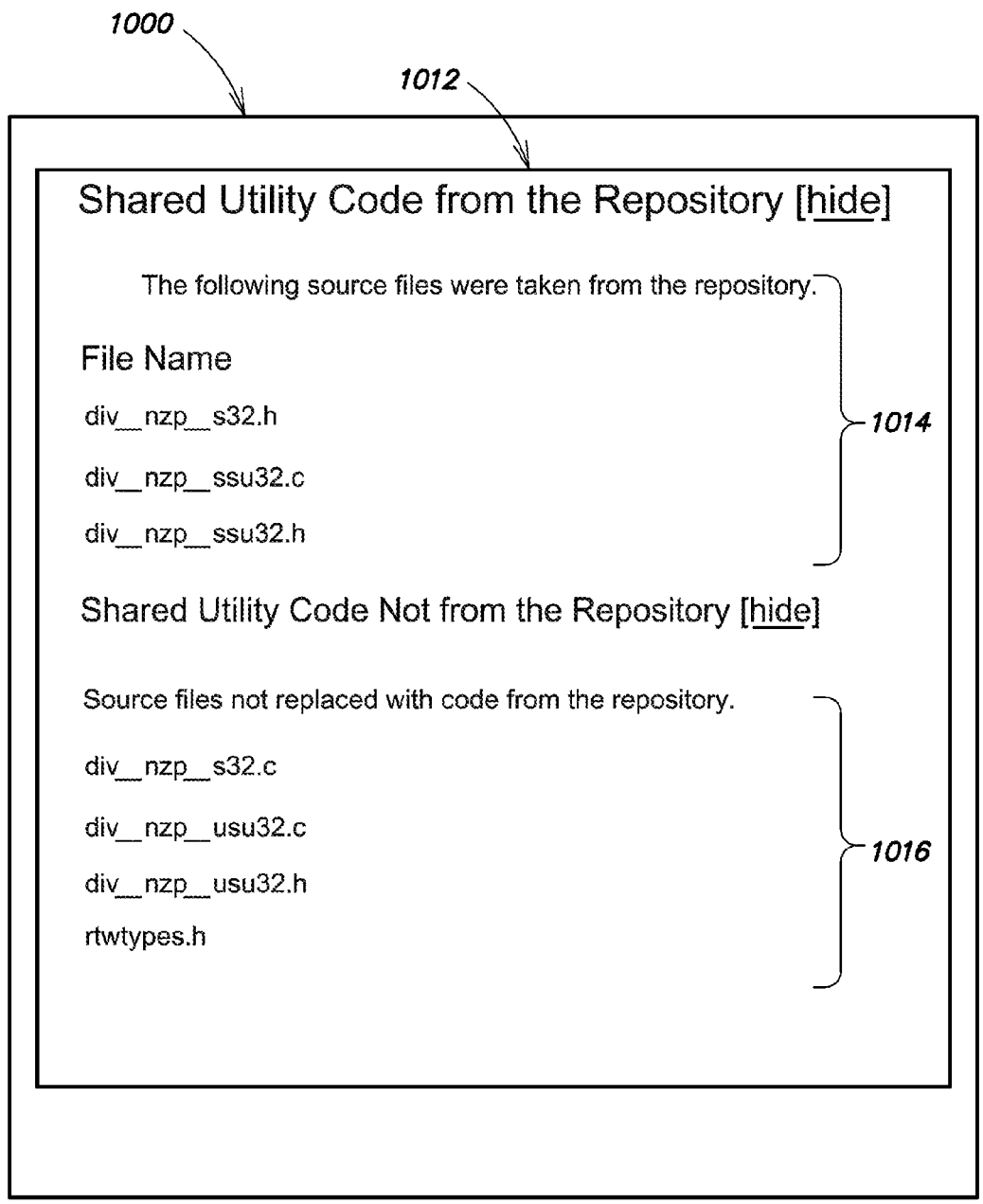

FIGS. 10A and 10B are partial views of a schematic illustration of a report 1000. The report 1000 may include a plurality of parts. A first part 1002 may identify the components of the model for which code is being reused. The first part 1002 may identify the components by name, location of artifacts, and the release number of the code generator that created the reused code. The first part 1002 may include entries for a FuelSwitch component, a MotorControl component, and a Guidance component. By selecting an entry in the first part 1002 additional information regarding the selected component may be presented in the report. For example, in response to selecting the entry for the FuelSwitch component in the first part 1002, the report generator 208 may include a second part 1004 in the report 1000 providing information on the code being reused for the FuelSwitch component. The second part 1004 may present information on the source files being reused, such as main and header files, as indicated at 1006. The second part 1004 may present information on interface functions and arguments, as indicated at 1008, as well as interface parameters, as indicated at 1010.

The report 1000 may include a third part 1012 (FIG. 10B) concerning shared utility source files. For example, the third part 1012 may identify, for example, by name, the shared utility source files from the repository 214 that are being used, as indicated at 1014. The third part 1012 also may identify by name the shared utility source files generated by the code generator 200 and thus not taken from the repository 214, as indicated at 1016.

In some embodiments, the report 1000 may include other or additional information.

In some embodiments, the code integration engine 210 may construct or modify an interface of the code 222 being generated for the system model 300 to conform with an interface of code other than code generated for a component of the system model 300. For example, the code integration engine 210 may receive custom code, such as handwritten Java code, and one or more artifacts associated with the custom code. The code integration engine 210 may utilize information from the one or more artifacts to control the creation of an interface of the code 222 generated for the system model 300 to conform to the custom code.

In some embodiments, the code integration engine 210 may automatically construct one or more wrapper objects to permit use of custom code.

In some embodiments, the model editor 104 may automatically modify the system model 300. Specifically, the model editor 104 may add one or more model elements to the system model 300 where the one or more model elements represent reused code for a component of the system model 300. For example, the model editor 104 may replace the model reference block of FIG. 3 for the first component 224 with one or more model reference elements. The one or more model reference elements may point to a package containing the reused code and one or more artifacts associated with the reused code.

In some embodiments, selecting the one or more model reference elements may cause the report generator 208 to generate a report for the first component 224. It should be understood that the modeling environment 100 may take other actions in response to the selection of the one or more mode reference elements included in the system model 300.

Illustrative Data Processing System

Figure 11:
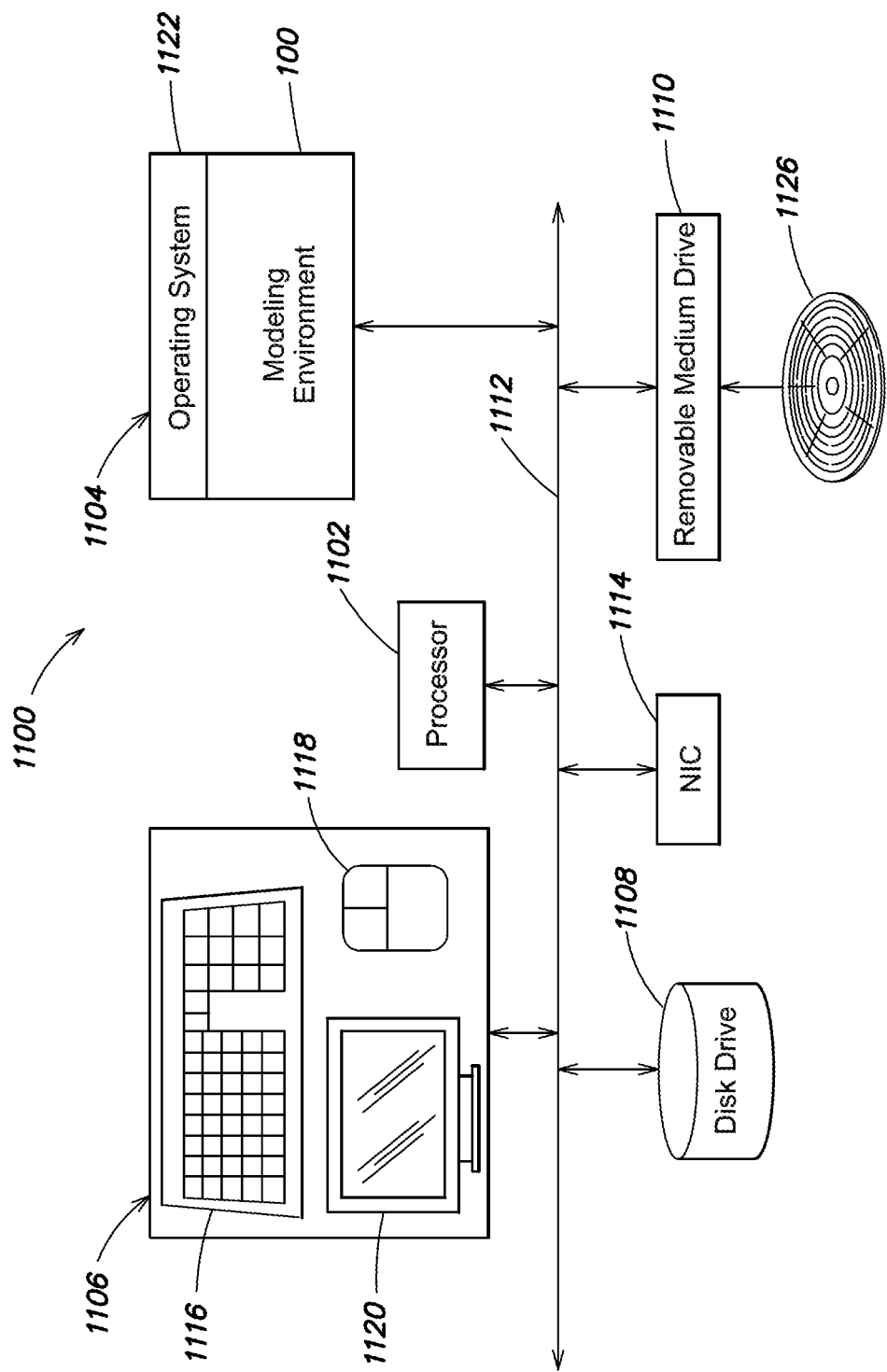
FIG. 11 is a schematic illustration of a data processing system in accordance with an embodiment.

FIG. 11 is a schematic illustration of a computer or data processing system 1100 for implementing an embodiment of the invention. The computer system 1100 may include one or more processing elements, such as a processor 1102, a main memory 1104, user input/output (I/O) 1106, a persistent data storage unit, such as a disk drive 1108, and a removable medium drive 1110 that are interconnected by a system bus 1112. The computer system 1100 may also include a communication unit, such as a network interface card (NIC) 1114. The user I/O 1106 may include a keyboard 1116, a pointing device, such as a mouse 1118, and a display 1120. Other user I/O 1106 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1104, which may be a Random Access Memory (RAM), may store a plurality of program libraries or modules, such as an operating system 1122, and one or more application programs that interface to the operating system 1122, such as the modeling environment 100, including the code generator 200. One or more objects or data structures may also be stored in the main memory 1104, such as the system model 300, the component models 224, 226, and 228, and the generated code 230, 232, and 222, among other data structures.

The removable medium drive 1110 may accept and read a computer readable media 1126, such as a CD, DVD, floppy disk, solid state drive, tape, flash memory or other medium. The removable medium drive 1110 may also write to the computer readable media 1126.

Suitable computer systems include personal computers (PCs), workstations, servers, laptops, tablets, palm computers, smart phones, electronic readers, and other portable computing devices, etc. Nonetheless, those skilled in the art will understand that the computer system 1100 of FIG. 11 is intended for illustrative purposes only, and that the present invention may be used with other computer systems, data processing systems, or computational devices. The present invention may also be used in a networked, e.g., client-server, computer architecture, or a public and/or private cloud computing arrangement. For example, the modeling environment 100 may be hosted on a server, and accessed by a remote client through an application hosting system, such as the Remote Desktop Connection tool from Microsoft Corp.

Suitable operating systems 1122 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1122 may provide services or functions for other modules, such as allocating memory, organizing data according to a file system, prioritizing requests, etc. The operating system 1122 may run on a virtual machine, which may be provided by the data processing system 1100.

As indicated above, a user or developer, such as an engineer, scientist, programmer, etc., may utilize one or more input devices, such as the keyboard 1116, the mouse 1118, and the display 1120 to operate the modeling environment 100, and construct one or more models, such as the system model 300. As discussed, the models may be computational and may have executable semantics. In particular, the models may be simulated or run. In particular, the models may provide one or more of time-based, event-based, state-based, message-based, frequency-based, control-flow based, and dataflow-based execution semantics. The execution of a model may simulate operation of the system that is being designed or evaluated.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system (e.g., system 100) or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1100. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

What is claimed is:

1. A method comprising:
   in connection with a first model having executable semantics and including a component,
   receiving, on a computer, first code, the first code corresponding to the component of the first model, and including a first interface;
   receiving, on the computer, an indication to reuse the first code;
   automatically generating, on the computer, second code, the second code generated for at least a portion of the first model or for at least a portion of a second model by a first code generator, and including a second interface;
   analyzing, on the computer, one or more artifacts associated with the first code that are different from the first code to obtain information on incompatibilities between the first code and default code that the first code generator otherwise produces, wherein the one or more artifacts include at least one of a data structure having data regarding the first code being reused, metadata associated with the first code being reused, or release notes associated with the first code being reused; and
   utilizing, during the automatically generating, the information on the incompatibilities between the first code and the default code that the first code generator otherwise produces to create or to modify the second interface so that the second interface interoperates with the first interface of the first code being reused.

2. The method of claim 1 wherein the first code is generated by a second code generator and the first code generator and the second code generator are
   different code generators, or
   different releases of a same code generator.

3. The method of claim 2 further comprising:
   identifying a first shared utility source file generated by the second code generator;
   determining that the first shared utility source file generated by the second code generator can be reused by the first code generator; and
   directing the second code to access the shared utility source file generated by the second code generator.

4. The method of claim 3 where the determining includes:
   determining that the first shared utility source file generated by the second code generator has an equivalent functionality to a second shared utility source file generated by the first code generator.

5. The method of claim 1 wherein
   the information on the incompatibilities includes different function names in the first code and the default code that the first code generator otherwise produces.

6. The method of claim 1 wherein
   the first interface specifies a first argument of a function,
   the second interface specifies a second argument of the function,
   the second argument is different from the first argument, and
   the information on the incompatibilities identifies the first argument of the function.

7. The method of claim 1 wherein the component of the first model is a sub-model, a subsystem, a state chart, a subchart, a library, a Virtual Instrument (VI), or a subVI.

8. The method of claim 1 further comprising:
   performing verification testing of the first code; and
   locking the first code to prevent changes to the first code.

9. The method of claim 1 wherein the first model is
   a graphical model; or
   a textual model.

10. The method of claim 1 wherein the utilizing includes:
    modifying a call specified by the first code generator to conform to the first interface.

11. The method of claim 1 further comprising:
    automatically constructing, by the computer, one or more wrapper functions, where the one or more wrapper functions convert between the second interface of the second code and the first interface of the first code being reused.

12. The method of claim 1 wherein the first code conforms to a first programming language, and the second code conforms to a second programming language that is different than the first programming language.

13. The method of claim 12 further comprising:
    constructing a wrapper function that bridges between the first programming language and the second programming language.

14. The method of claim 12 further comprising:
    constructing a wrapper object that bridges between the first programming language and the second programming language.

15. The method of claim 1 further comprising: generating the first code for the component, where the generating includes generating the one or more artifacts associated with the first code, the one or more artifacts having the information on the incompatibilities.

16. The method of claim 1 further comprising:
    compiling the first code into an object code format; and
    including the compiled object code format of the first code in a build file for the first model.

17. The method of claim 1 wherein the first code is compiled and verified object code.

18. A method comprising:
    in connection with a first model having executable semantics and including a component,
    receiving first code, the first code corresponding to the component of the first model, and including a first interface;
    receiving an indication to reuse the first code;
    automatically generating, by a processor coupled to a memory, second code, the second code generated for at least a portion of the first model or for at least a portion of a second model by a first code generator, and including an interface;
    analyzing one or more data structures to identify one or more inconsistencies between the first interface of the first code and the interface of the second code, wherein the one or more data structures include at least one of information regarding the first code being reused, metadata associated with the first code being reused, or release notes associated with the first code being reused;

automatically defining, by the processor, one or more operations that convert between the one or more inconsistencies identified between the first interface of the first code and the interface of the second code; and incorporating the one or more operations into the second code.

19. The method of claim 18 wherein the one or more inconsistencies include at least one of:

different function names;
different function arguments; or
different function argument names.

20. The method of claim 18 wherein the component of first the model is a sub-model, a subsystem, a state chart, a subchart, a library, a Virtual Instrument (VI), or a subVI.

21. The method of 18 further comprising:

storing the one or more operations in one or more wrapper functions; and including the one or more wrapper functions with the second code.

22. A non-transitory computer-readable medium having program instructions executable by a processor, the program instructions comprising:

instructions to receive first computer programming code, the first computer programming code corresponding to a component of a first model having executable semantics, and including a first interface;

instructions to receive an indication to reuse the first computer programming code;

instructions to automatically generate by a processor second computer programming code, the automatically generated second computer programming code generated for at least a portion of the first model or for at least a portion of a second model by a first code generator, and including a second interface;

instructions to analyze one or more artifacts associated with the first computer programming code that are different from the first computer programming code to obtain information on incompatibilities between the first computer programming code and default code that the first code generator otherwise produces, wherein the one or more artifacts include at least one of a data structure having data regarding the first code being reused, metadata associated with the first code being reused, or release notes associated with the first code being reused; and instructions to utilize, during the automatically generating, the information on the incompatibilities between the first computer programming code and the default code that the first code generator otherwise produces to create or to modify the second interface so that the second interface interoperates with the first interface of the first computer programming code being reused.

23. The computer-readable medium of claim 22 where the instructions to utilize include at least one of:

instructions to conform the second interface to access a function specified in the first interface of the first computer programming code being reused with the second computer programming code;

instructions to conform the second interface to utilize a function argument specified in the first interface of the first computer programming code being reused with the second computer programming code; or instructions to conform the second interface to utilize a function name specified in the first interface of the first computer programming code being reused with the second computer programming code.

24. An apparatus comprising:

a computer memory storing a first model having executable semantics, the first model including a component; and a processor coupled to the computer memory, the processor configured to:

receive first code, the first code corresponding to the component of the first model, and including a first interface;

receive an indication to reuse the first code; generate second code, the second code generated for at least a portion of the first model or for at least a portion of a second model by a first code generator, and including a second interface;

analyze one or more artifacts associated with the first code that are different from the first code to obtain information on incompatibilities between the first code and default code that the first code generator otherwise produces, wherein the one or more artifacts include at least one of a data structure having data regarding the first code being reused, metadata associated with the first code being reused, or release notes associated with the first code being reused; and utilize, during the generate, the information on the incompatibilities between the first code and the default code that the first code generator otherwise produces to create or to modify the second interface so that the second interface interoperates with the first interface of the first code being reused.

25. The apparatus of claim 24 wherein the information on the incompatibilities includes at least one of different function names or different arguments.

26. The apparatus of claim 24 wherein the first code conforms to a first programming language and the second code conforms to a second programming language that is different than the first programming language, and the processor is further configured to:

construct a wrapper function that bridges between the first programming language and the second programming language.

27. The apparatus of claim 24 wherein the processor is further configured to:

identify a first shared utility source file generated by a second code generator;

determine that the first shared utility source file generated by the second code generator can be reused by the first code generator; and direct the second code to access the shared utility source file generated by the second code generator.

* * * * *

UNITED STATES PATENT AND TRADEMARK OFFICE
CERTIFICATE OF CORRECTION

PATENT NO. : 9,952,837 B1
APPLICATION NO. : 14/676230
DATED : April 24, 2018
INVENTOR(S) : David Maclay et al.

Page 1 of 1

It is certified that error appears in the above-identified patent and that said Letters Patent is hereby corrected as shown below:

In the Claims
Claim 20, Column 25, Line 17 reads:
"first the model is a sub-model, a subsystem, a state chart, a"
Should read:
--the first model is a sub-model, a subsystem, a state chart, a--

Signed and Sealed this
Twenty-second Day of October, 2019

Andrei Iancu
*Director of the United States Patent and Trademark Office*